United States Patent [19]

Ehrsam et al.

[11] 4,203,166
[45] May 13, 1980

[54] CRYPTOGRAPHIC FILE SECURITY FOR MULTIPLE DOMAIN NETWORKS

[75] Inventors: William F. Ehrsam, Kingston; Robert C. Elander, Saugerties; Stephen M. Matyas, Poughkeepsie; Carl H. W. Meyer, Kingston; Richard J. Sahulka; Walter L. Tuchman, both of Woodstock, all of N.Y.

[73] Assignee: International Business Machines Corporation, Armonk, N.Y.

[21] Appl. No.: 857,535

[22] Filed: Dec. 5, 1977

[51] Int. Cl.² ............................................. H04L 9/00
[52] U.S. Cl. .................................. 375/2; 340/149 R
[58] Field of Search ......... 178/22; 340/152 R, 149 R, 340/149 A; 364/900 MS File, 200 MS File

[56] References Cited

U.S. PATENT DOCUMENTS 3,962,539   6/1976   Ehrsam ................................. 178/22

OTHER PUBLICATIONS

Diffie et al., "Multiuser Cryptographic Techniques", *AFIPS—Conference Proceedings*, vol. 45, N.C.C., 1976, pp. 109-112.
Diffie et al., "New Directions in Cryptography", *IEEE Transactions on Information Theory*, vol. IT-22, No. 6, Nov. 1976, pp. 644-654.

*Primary Examiner*—Howard A. Birmiel

*Attorney, Agent, or Firm*—Edwin Lester

[57] ABSTRACT

A file security system for data files created at a first host system in one domain and recovered at a second host system in another domain of a multiple domain network. Each of said host systems contain a data security device provided with multiple host keys capable of performing a variety of cryptographic operations. Creation and recovery of a secure data file is accomplished without revealing the keys of either of the host systems to the other of the host systems. When the data file is to be created at the first host system, the first host system data security device provides a file recovery key for subsequent recovery of the data file at the second host system and enciphers first host system plaintext under a primary file key, which is related to the file recovery key, to obtain first host system ciphertext as the data file. The file recovery key is used as header information for the data file or maintained as a private file recovery key. When the data file is to be recovered at the second host system, the file recovery key is provided at the second host system and the second host system data security device performs a cryptographic operation to transform the file recovery key into a form which is usable to decipher the data file. The second host system data security device then uses the transformed file recovery key to perform a cryptographic operation to obtain the first host system ciphertext in clear form at the second host system.

43 Claims, 25 Drawing Figures

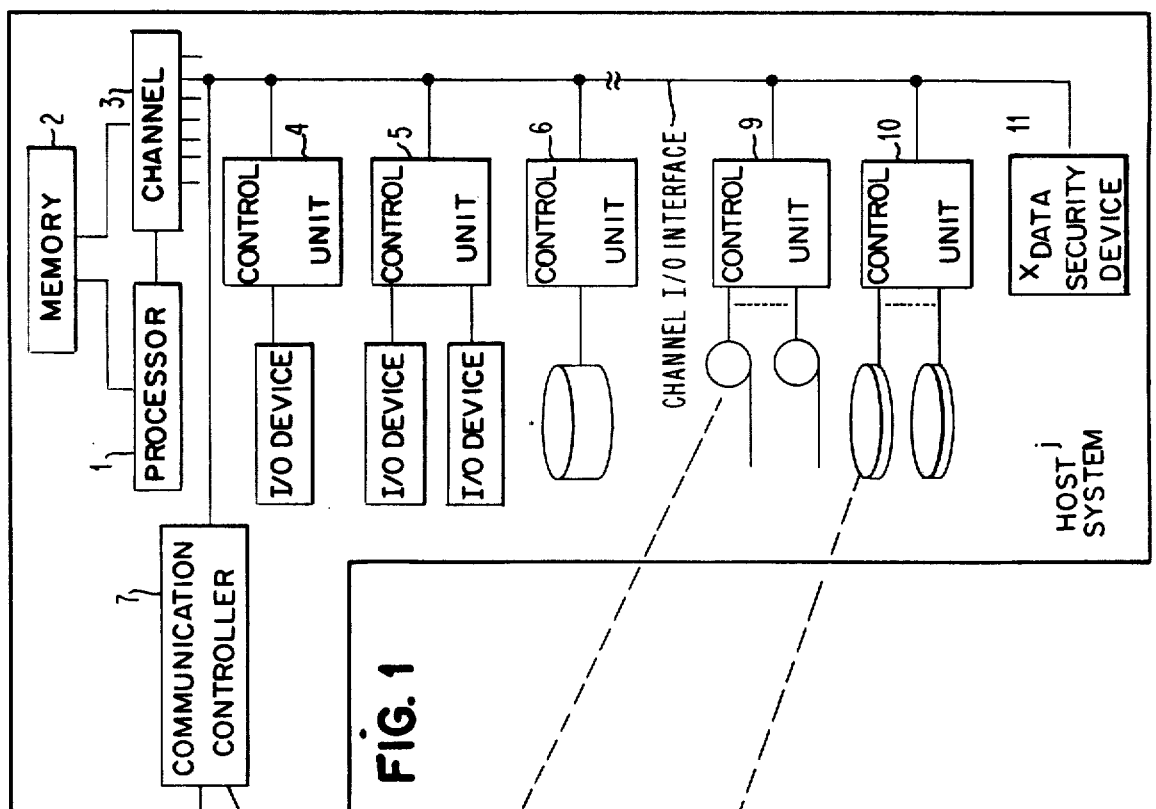
FIG. 1
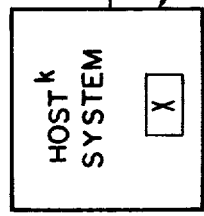
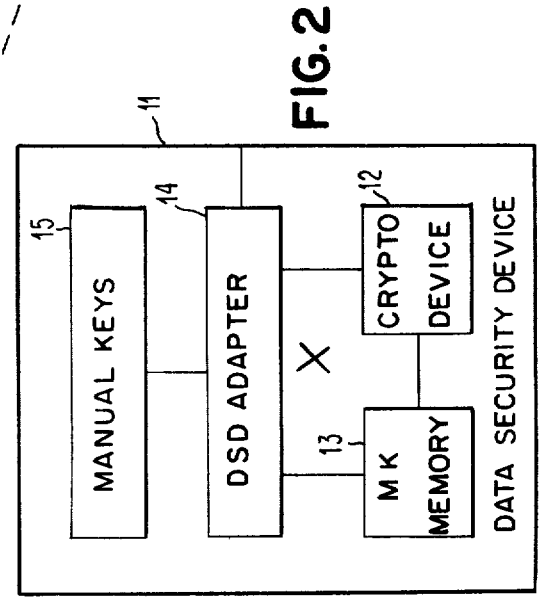
FIG. 2

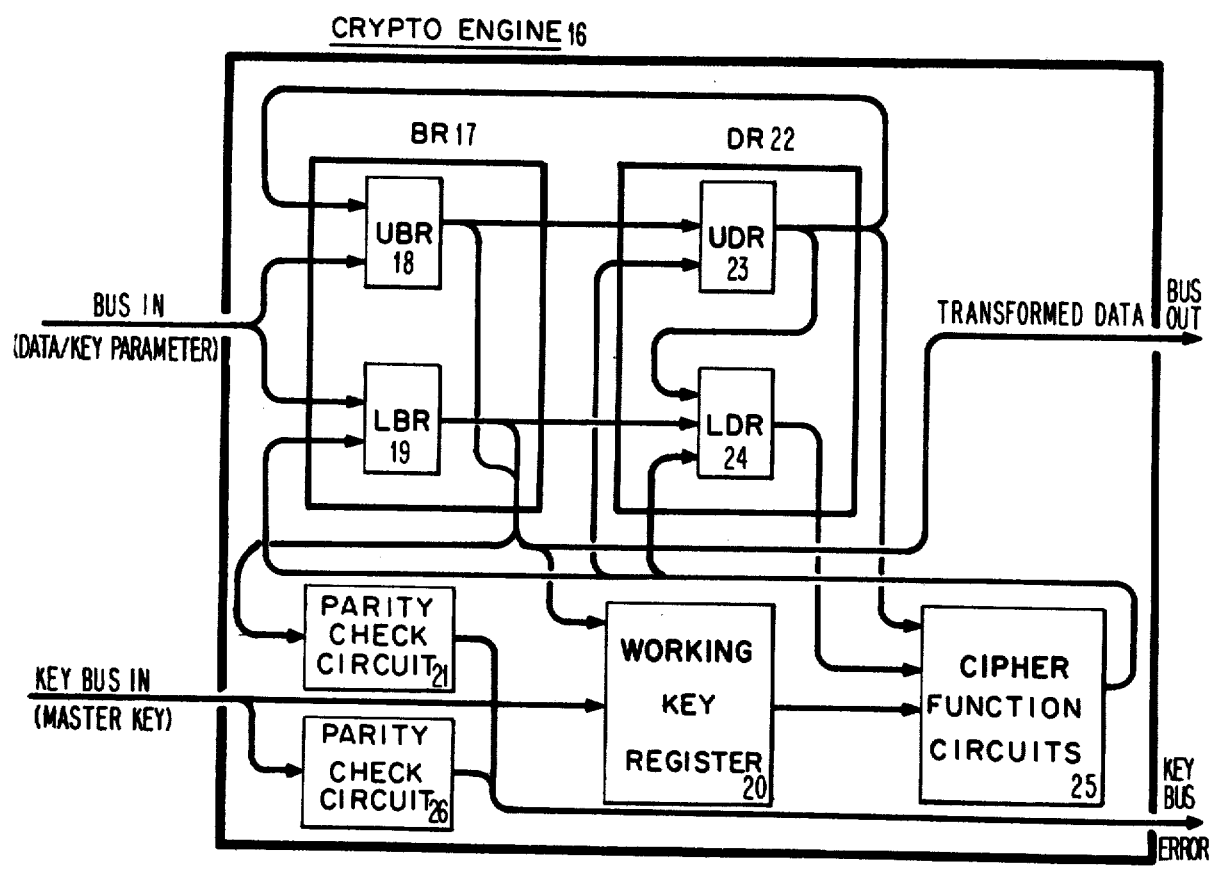
FIG. 3
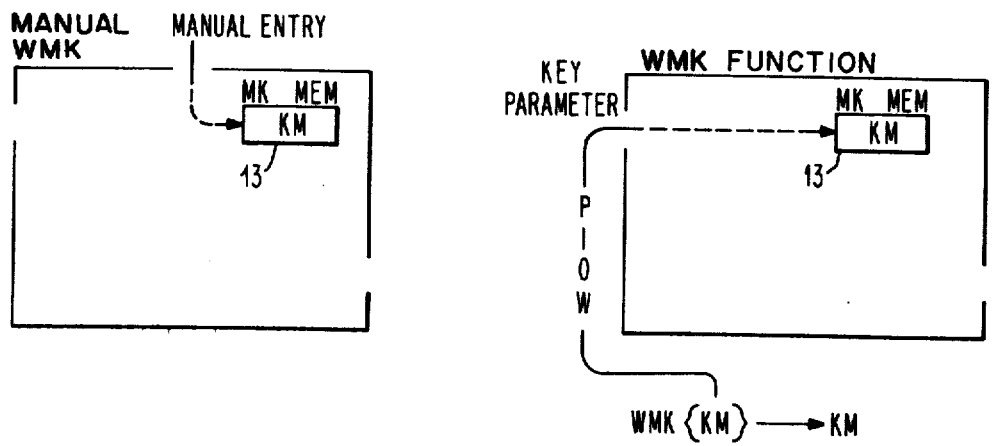
FIG. 4
FIG. 5

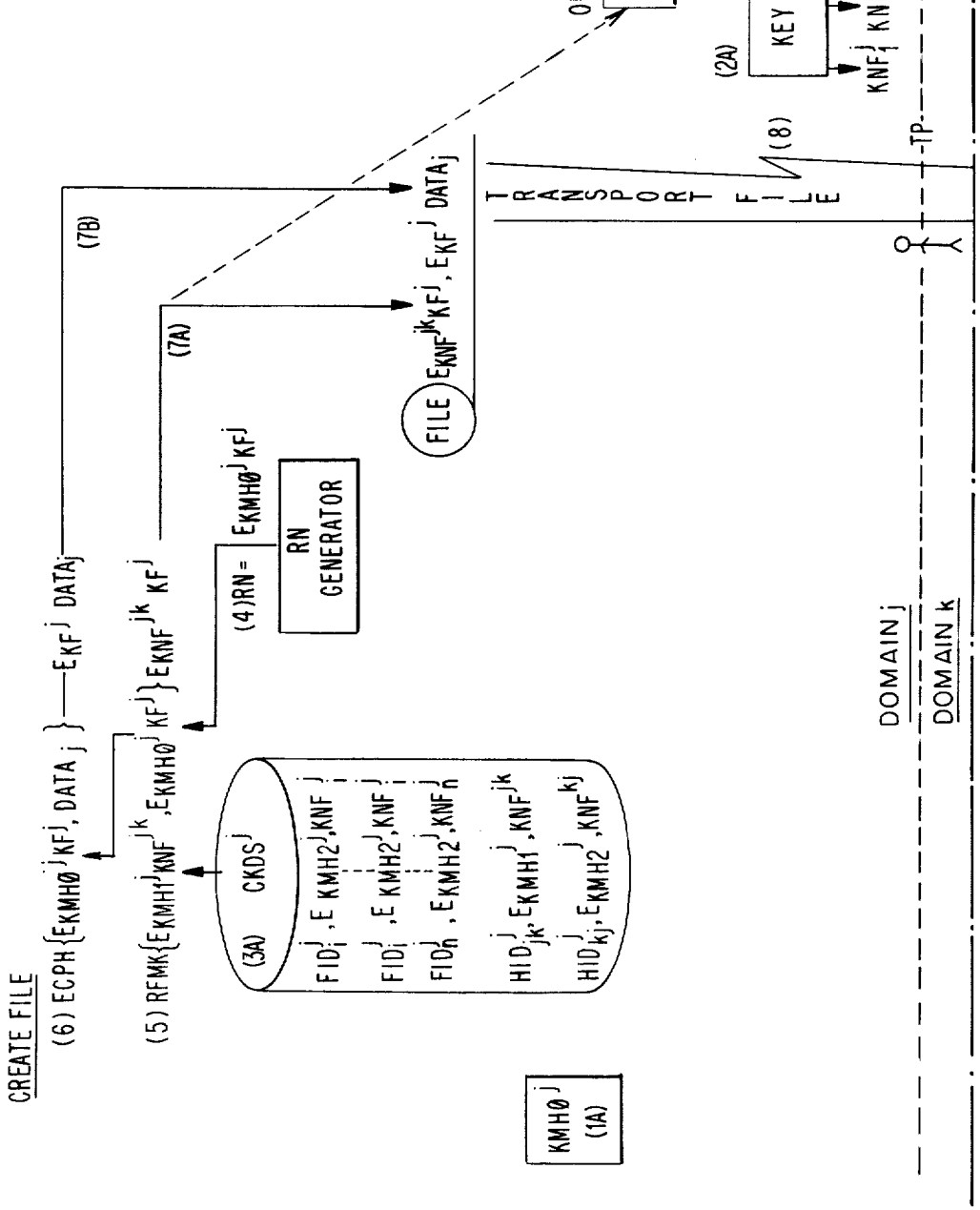
FIG. 18 MULTIPLE DOMAIN FILE SECURITY—SYSTEM KEY

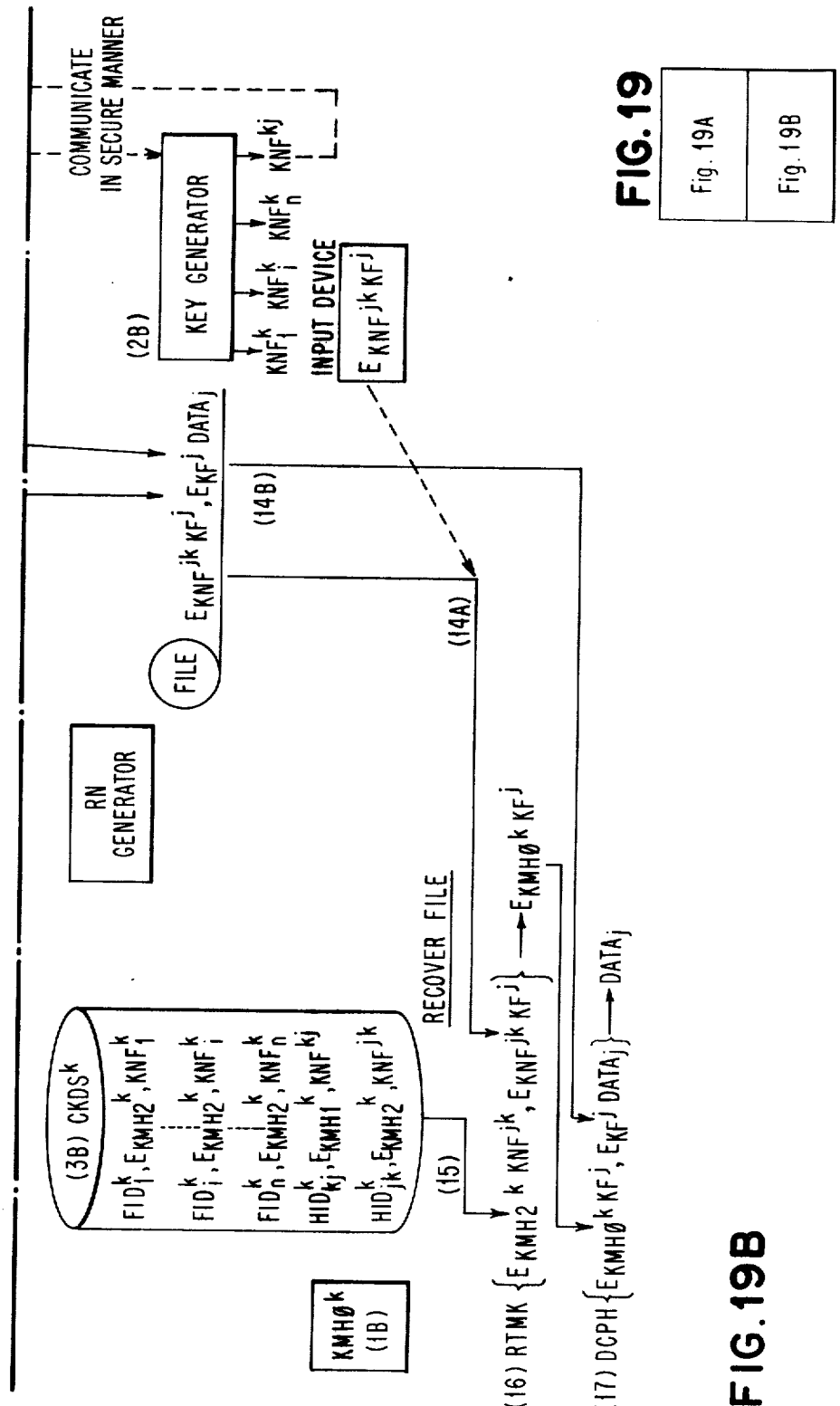

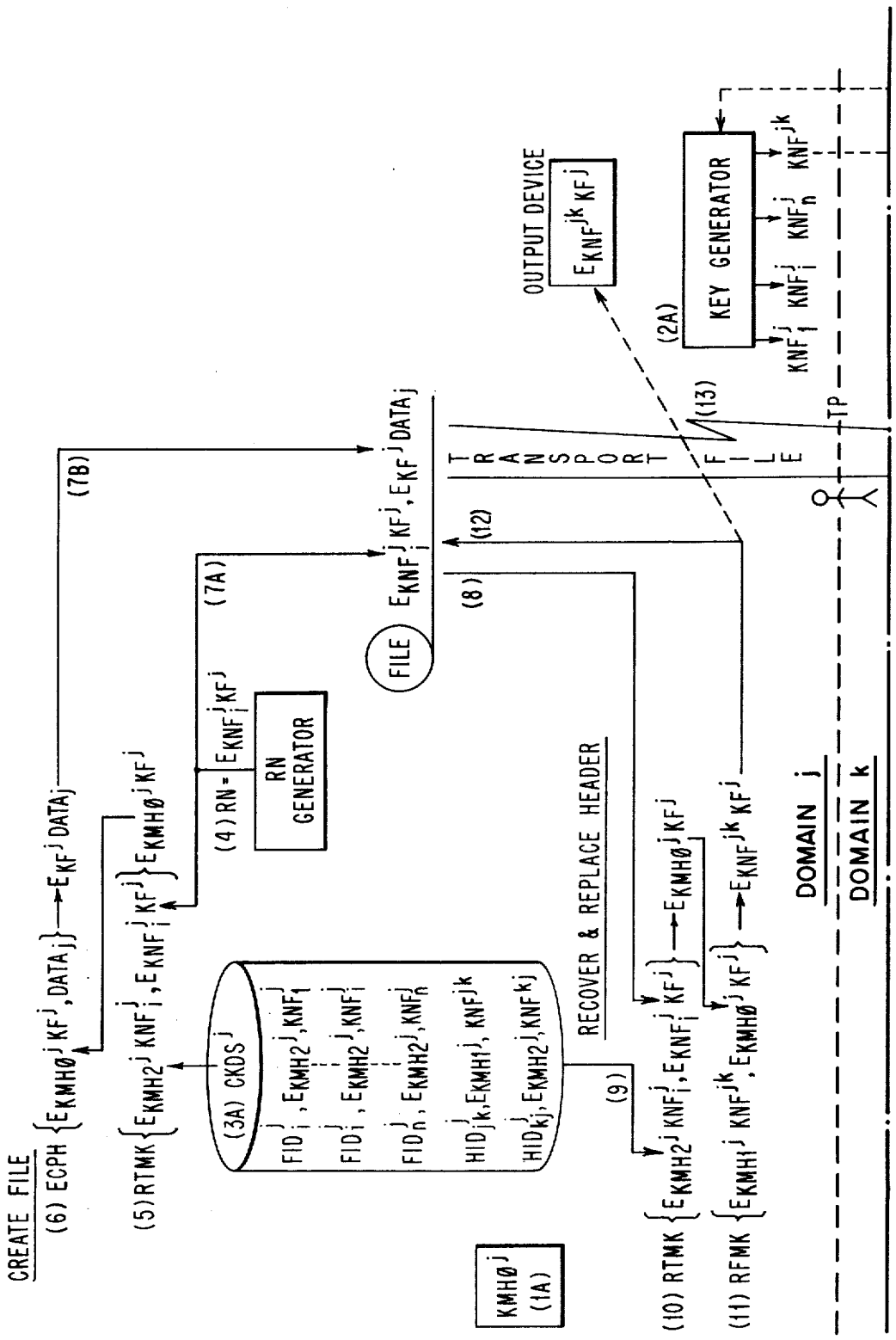

MULTIPLE DOMAIN FILE SECURITY—PRIVATE KEY
(PRIVATE PROTOCOL)

HOST$^j$ INITIALIZATION (1A) WMK $(KMH0^j) \rightarrow KMH0^j$ (2A) DEFINE $KFP^{jk}$ (3A) LOAD $KFP^{jk}$ IN HOST$^j$ (4A) EMK$0^j (KFP^{jk}) \rightarrow E_{KMH0^j} KFP^{jk}$ (5A) WRITE (4A) TO OUTPUT DEVICE (6A) STORE OUTPUT IN SECURE MANNER TILL CREATE FILE

CREATE FILE (7) LOAD $E_{KMH0^j} KFP^{jk}$ IN HOST$^j$ (8) ECPH $(E_{KMH0^j} KFP^{jk}, DATA_j) \rightarrow E_{KFP^{jk}} DATA_j$

COMMUNICATE IN SECURE MANNER

DOMAIN j

---

DOMAIN k

HOST$^k$ INITIALIZATION (1B) WMK $(KMH0^k) \rightarrow KMH0^k$ (2B) RECEIVE $KFP^{jk}$ (3B) LOAD $KFP^{jk}$ IN HOST$^k$ (4B) EMK$0^k (KFP^{jk}) \rightarrow E_{KMH0^k} KFP^{jk}$ (5B) WRITE (4B) TO OUTPUT DEVICE (6B) STORE OUTPUT IN SECURE MANNER TILL RECOVER FILE

RECOVER FILE

(10) LOAD $E_{KMH0^k} KFP^{jk}$ IN HOST$^k$

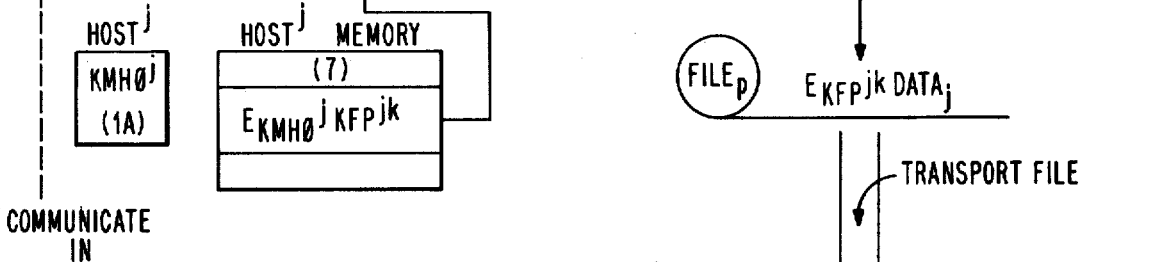

(12) DCPH $\{E_{KMH0^k} KFP^{jk}, E_{KFP^{jk}} DATA_j\} \rightarrow DATA_j$

CRYPTOGRAPHIC FILE SECURITY FOR MULTIPLE DOMAIN NETWORKS

CROSS REFERENCE TO RELATED APPLICATIONS

This application is related to the following patent applications which are concurrently filed herewith and assigned to the same assignee as the present application:

1. "Cryptographic Communication and File Security Using Terminals", Ser. No. 857,533, filed Dec. 5, 1977, by W. F. Ehrsam et al.
2. "Cryptographic Communication Security for Single Domain Networks", Ser. No. 857,532, filed Dec. 5, 1977, by W. F. Ehrsam et al.
3. "Cryptographic File Security for Single Domain Networks", Ser. No. 857,534, filed Dec. 5, 1977, by W. F. Ehrsam et al.
4. "Cryptographic Communication Security for Multiple Domain Networks", Ser. No. 857,531, filed Dec. 5, 1977, by W. F. Ehrsam et al.
5. "Cryptographic Verification of Operational Keys Used in Communication Networks", Ser. No. 857,546, filed Dec. 5, 1977, by W. F. Ehrsam et. al.

BACKGROUND OF THE INVENTION

This invention relates to cryptographic file security techniques in a multiple domain data processing system and, more particularly, to a file security system for data files created at a first host system in one domain and recovered at a second host system in another domain of a multiple domain data processing system where each host system includes a data security device which permits crytographic operations to be performed in the creation and recovery of a data file.

With the increasing number of computer end users, sharing of common system resources such as files, programs and hardware and the increasing use of distributed systems and telecommunications, larger and more complex computer base information systems are being created. In such systems, an increasing amount of sensitive data may be stored on data files for long periods of time. Because of this fact, there is an increasing concern that such data files may become accessible to unauthorized persons if maintained for too long a period of time. Cryptography has been recognized as an effective data security measure in that it protects the data itself rather than the media on which it is stored.

Cryptography deals with methods by which message data called cleartext or plaintext is encrypted or enciphered into unintelligible data called ciphertext and by which the ciphertext is decrypted or deciphered back into the plaintext. The encipherment/decipherment transformations are carried out by a cipher function or algorithm controlled in accordance with a cryptographic or cipher key. The cipher key selects one out of many possible relationships between the plaintext and the ciphertext. Various algorithms have been developed in the prior art for improving data security in data processing systems. Examples of such algorithms are described in U.S. Pat. No. 3,796,830 issued Mar. 12, 1974 and U.S. Pat. No. 3,798,359 issued Mar. 19, 1974. Another more recent algorithm providing data security in data processing systems is described in U.S. Pat. No. 3,958,081 issued May 18, 1976. This algorithm was adopted by the National Bureau of Standards as a data encryption standard (DES) algorithm and is described in detail in the Federal Information Processing Standards publication, Jan. 15, 1977, FIPS PUB 46.

A data processing system may consist of a single host system which includes a host processor, host memory, channel and its associated resources such as the host programs and locally attached terminals and data files. The domain of the host system is considered to be the set of resources known to and managed by the host system.

Cryptographic File Security in a data processing system is concerned with the protection of a data file which is stored in a storage media for a relatively long period of time or when stored in a portable storage media for transporting outside the environment of the data processing system. In prior art cryptographic file security arrangements, when sensitive data is to be stored in a storage media, a cryptographic facility provided at the host system is invoked to encipher the data, using a cipher key known only to the user, after which the enciphered data file is written to the storage media. Since the enciphered data file must be read and deciphered for subsequent data processing operations, it is necessary to use the same cipher key for the decipher operation. Accordingly, file security is dependent solely on the security of the cipher key since obtaining a copy of the enciphered data file by unauthorized means or by theft of the data file by unauthorized persons will be of no avail to anyone unless he has knowledge of the cipher key used to encipher the data file. File Security, therefore, becomes dependent solely on the user's knowledge and his own actions in keeping the cipher key secret. If the stored information is shared between many users then the security of the data file is further weakened. If the cipher key is stored in the system, especially for long periods of time, a method of controlled access must be devised to assure its suitable protection. Furthermore, if the cipher key becomes known by an unauthorized person and the enciphered data file is stolen or a copy made, then total protection is lost and the data file may be recovered at any data processor which has a cryptographic facility.

As the size of data processing systems increases, other host systems may be joined to form a multiple domain processing system with each host system having knowledge of and managing its associated resources which make up a portion or domain of the processing system. With the increasing size of such systems, greater use is being made of portable storage media where a data file created at a host system in one domain is transported for recovery at a host system in another domain of the multiple domain processing system. Because of the fact that an increasing number of such portable storage media is being transported from one domain to another, there is an increasing need to provide file security for such data files.

Accordingly, it is an object of the invention to provide file security for data files created in one domain and recovered in another domain of a multiple domain data processing system.

Another object of the invention is to maintain the security of data files created by a first host system and recovered by a second host system.

A further object of the invention is to provide a host system cryptographic facility for creating a data file for recovery at another host system in a secure manner.

Still another object of the invention is to provide a host system cryptographic facility operating under control of secure host keys for creating a data file for recovery at another host system without the need for revealing the host keys of the creating host system to the other host system.

Still a further object of the invention is to provide a cross domain key which allows cross domain file comunication of data files between host systems in different domains of a data processing system.

Still another object of the invention is to provide a cross domain key which is known by a host system which creates a data file and the host system which recovers the data file.

Still a further object of the invention is to maintain the security of cross domain keys by protecting them under a host key encrypting key.

Still another object of the invention is to protect a cross domain key under a key encrypting key of a host system which creates a data file and under a different key encrypting key of a host system which recovers the data file.

Still a further object of the invention is to protect the cross domain key used when creating a data file for recovery at another host system by a first host key encrypting key used when recovering a data file created at another host system by a first host key encrypting key and to protect the cross domain key used when recovering a data file created at the other host system by a second host key encrypting key.

Still another object of the invention is to create a secure data file in one domain of a multiple domain data processing system which is only recoverable at a specific other domain of the system.

Still a further object of the invention is to provide a file recovery key for a secure data file created in one domain of a multiple domain data processing system which permits recovery of the secure data file at another domain of the system.

Still another object of the invention is to provide a file recovery key as header information for a secure data file.

Still a further object of the invention is to maintain a file recovery key for a secure data file as a private key.

Still another object of the invention is to encipher file data under an operational key to obtain a secure data file and to provide a file recovery key for the secure data file which consists of the operational key enciphered under a cross domain key known at different domains of a multiple domain data processing system.

Still a further object of the invention is to provide an irreversible transformation function for creating a file recovery key for a secure data file created at a host system in one domain to permit recovery of the secure data file at a host system in another domain of a multiple domain data processing system.

Still another object of the invention is to recover a file recovery key used for recovery of a secure data file at a host system in one domain and replace it with a file recovery key used for recovery of the data file at a host system in another domain of a multiple domain data processing system.

Still a further object of the invention is to provide a private cross domain key which allows cross domain file communication of a private data file between host systems in different domains of a data processing system.

In accordance with the invention, a multiple domain data processing system is provided in which each domain includes a host system with an integrated data security device and associated data files to permit cryptographic data transmissions between the host and the associated data files. The data security devices of the host systems include a memory for storing a master key and cryptographic apparatus for ciphering input data under control of a cryptographic key to produce ciphered output data. For cross-domain file communication between the host system in one domain and the host system in another domain, the host data security device of each host system generates a random number which is defined as a cross domain key for cross domain file communication between the two host systems and is communicated in a secure manner to the other host system. The cross-domain key generated at each host system is protected at that host system by encipherment under a first key encrypting key and stored in enciphered form as a sending cross-domain key while the cross-domain key received at that host system from the other host system is protected by encipherment under a second key encrypting key and stored in enciphered form as a receiving cross-domain key. When a data file is to be created at the host system in one domain and recovered at the host system in another domain, the host data security device of the originating host system generates a random number which is defined as being a primary file key enciphered under the host master key of the originating host system. The originating host system data security device then performs a transformation operation in accordance with the enciphered sending cross-domain key and the enciphered file key to reencipher the file key from encipherment under the originating host master key to encipherment under the sending cross-domain key as a file recovery key for recovery of the data file at the host system of the other domain. The originating host system data security device then performs an encipher operation in accordance with the primary file key enciphered under the host master key and host system plaintext to obtain host system plaintext enciphered under the primary file key as host system ciphertext for the data file. The file recovery key may be provided as header information or maintained as a private key for the data file. When the data file is to be recovered at the receiving host system in the other domain, the receiving host data security device performs a transformation function in accordance with the enciphered receiving cross-domain key stored at the receiving host system and the file recovery key obtained as header information or inputted as a private key to reencipher the primary file key from encipherment under the sending cross-domain key to encipherment under the host master key of the receiving host system. The receiving host system data security device then performs a decipher operation in accordance with the primary file key enciphered under the receiving host system master key and the data file of host system ciphertext to obtain the host system ciphertext in clear form at the receiving host system.

Other arrangements are also provided which permit a variety of file security applications in a multiple domain data processing system. In one such application, where a secure data file is created having a file recovery key which allows recovery of the data file at the originating host system, an arrangement is provided by which the file recovery key is recovered and replaced with a file recovery key which allows recovery at a host system in another domain of the data processing system. Additionally, a further arrangement is provided which allows a file security application using a pre-defined private cross-domain key for private data files.

The foregoing and other objects, features and advantages of the invention will be apparent from the following particular description of a preferred embodiment of the invention, as illustrated in the accompanying drawings.

BRIEF DESCRIPTION OF THE DRAWING

FIG. 1 is a block diagram illustrating a multiple domain data processing system.

FIG. 2 is a block diagram of a data security device used in the data processing network of FIG. 1.

FIG. 3 is a block diagram of a cryptographic engine which performs cryptographic functions in a logically and physically secure manner.

FIG. 4 illustrates in block diagram form a manual WMK function.

FIG. 5 illustrates in block diagram form a host controlled WMK function.

FIGS. 19a and b are a block diagram illustrating details of cryptographic file security where a file recovery key for recovery of a data file in one domain is recovered and replaced with a file recovery key which allows recovery of the data file in another domain of a multiple domain data processing system.

FIG. 21 is a block diagram illustrating details of cryptographic file security in a multiple domain data processing system using a cross-domain file key.

GENERAL DESCRIPTION

INTRODUCTION

Figure 6:
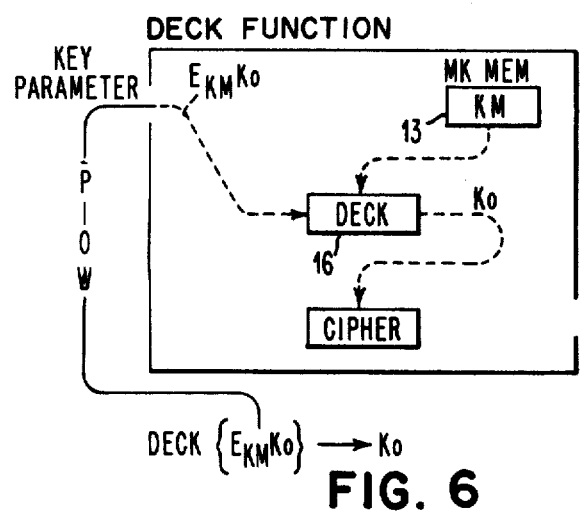
FIG. 6 illustrates in block diagram form a DECK function.

A data processing system may consist of a host system and its associated resources such as host programs, and locally attached terminals and secondary storage files. As the size of data processing systems increases, other host systems may be joined to form a multiple domain processing system with each host system having knowledge of and managing its associated resources which make up a portion or domain of the processing system. With the increasing size of such systems, greater use is being made of portable storage media where a data file created at a host system in one domain is transported for recovery at a host system in another domain of the multiple domain processing system. Because of the fact that an increasing number of such portable storage media is being transported from one domain to another, there is an increasing need to provide file security for such data files. Cryptography provides an effective data security measure for file security in that it protects the confidentiality and integrity of the data itself rather than the media on which it is stored. FIG. 1 illustrates a cryptographic arrangement in a representative multiple domain data processing system.

Most practical cryptographic systems require two basic elements, namely, (1) a cryptographic algorithm which is a set of rules that specify the steps required to transform or encipher plaintext into ciphertext or to transform or decipher ciphertext back into plaintext and (2) a cipher key. The cipher key is used to select one out of many possible relationships between the plaintext and the ciphertext. Various cryptographic algorithms have been developed in the prior art for improving data security in data processing systems. One such algorithm is described in U.S. Pat. No. 3,958,081 issued May 18, 1976 and was recently adopted as a United States Federal Data Processing Standard as set forth in the aforesaid Federal Information Processing Standard publication. A hardware implementation of this algorithm is incorporated in the present invention. The cryptographic algorithm operates to transform or encipher a 64 bit block of plaintext into a unique 64 bit block of ciphertext under control of a 56 bit cipher key or to transform or decipher a 64 bit block of ciphertext back into an original 64 bit block of plaintext under control of the same 56 bit cipher key with the deciphering process being the reverse of the enciphering process. The effectiveness of this cipher process depends on the techniques used for the selection and management of the cipher key used in the cipher process. The only cipher key actually used in the cipher process to personalize the alogrithm when encrypting or decrypting data or other keys is termed the working key and is accessible only by the cryptographic apparatus. All other keys hereafter discussed are used at different times as working keys depending upon the cipher operation to be performed.

There are basically two categories of cipher keys used in the cryptographic system, namely, operational keys (KO) and key encrypting keys (KEK) with operational keys being referred to and used as data encrypting keys. Data encrypting or operational keys are a category of keys used to encrypt/decrypt data while key encrypting keys are a category of keys used to encrypt/decrypt other keys.

Within the two basic categories, there are variously defined classes and types of cipher keys. Thus, in the data encrypting or operational class of cipher keys, the data encrypting or operational key which protects data stored in data files is a class of key called the primary file key. One type of this class of keys is one which is a system generated, time variant, dynamically created key in enciphered form under a key encrypting key of the originating host system. The key will be referred to as the system file key (KF). In private cryptographic systems which use a private protocol known to the end users but unknown to the system, a private key may be used as another type of primary file key to provide file security. The key exists only for a time duration determined by the private protocol and will be referred to as the private file key (KFP).

Within the key encrypting category of cipher keys, there are two sub-categories, namely, the primary key encrypting key and the secondary key encrypting key. In the primary key encrypting key sub-category of cipher keys, the key encrypting key used in the host system to encipher other keys is a class of key called the system key. One type of this class of keys is one which is used to protect the system file keys actively used at the host and will be referred to as the host master key (KMH). In the secondary key encrypting key sub-category of cipher keys, the key encrypting key used to protect other keys is a class of key called a secondary file key. Two types of this class of keys are used to protect system file keys when creating a file recovery key for recovery of a data file at the host system which creates the data file and when system generated will be referred to as the system secondary file key (KNF) and when provided as a pre-defined private key will be referred to as a private secondary file key (KNFP). Two additional types of this class of key are used to protect system file keys when creating a file recovery key for recovery of a data file created by a host system in one domain for recovery by a host system in another domain of a multiple domain processing system and when system generated will be referred to as a cross domain key (KNF$^{j/k}$) and when provided as a predefined private cross domain key will be referred to as a private cross domain key (KNFP$^{j/k}$). The various cipher keys defined above are summarized in the following table by category, class, type and use:

| CATEGORY | SECURITY CLASS | TYPE | USE |
|---|---|---|---|
| Key Encrypting Key | | | |
| Primary | System Key | Host Master Key (KMH) | Encipher |
| | | Secondary File Key (KNF) | Other |
| | Secondary | Private Secondary File Key (KNFP) | Cryptographic |
| Secondary | File | | Keys |
| | | Cross Domain Key (KNF$^{j/k}$) | |
| | Keys | Private Cross Domain Key (KNFP$^{j/k}$) | |
| Data Encrypting Keys | Primary | System File Key (KF) | Encipher Or |
| (Operational Keys KO) | File | Private System File Key (KFP) | Decipher Data |
| | Keys | | |

GENERATION, DISTRIBUTION, INSTALLATION AND MANAGEMENT OF CRYPTOGRAPHIC KEYS

Key generation is the process which provides for the creation of the cipher keys required by a cryptographic system. Key generation includes the specification of a system master key and primary and secondary file keys.

The host master key is the primary key encrypting key and is the only cipher key that needs to be present in the host cryptographic facility in clear form. Since the host master key does not generally change for long periods of time, great care must be taken to select this key in a random manner. This may be accomplished by using some random experiment such as coin tossing where bit values 0 and 1 are determined by the occurrence of heads and tails of the coin or by throwing dice where bit values 0 and 1 are determined by the occurrence of even or odd rolls of the dice, with the occurrence of each group of coins or dice being converted into corresponding parity adjusted digits. By enciphering all other cipher keys stored in or passed outside the host system, overall security is enhanced and secrecy for such other cipher keys reduces to that of providing secrecy for the single host master key. Secrecy for the host master key may be accomplished by storing it in a non-volatile master key memory so that the host master key need only be installed once. Once installed, the master key is generally used by the cryptographic apparatus for internally deciphering enciphered keys which may then be used as the working key in a subsequent encipher/decipher operation.

Installation of the host master key may be accomplished by a direct manual entry process using mechanical switches, dials, or a hand-held key entry device. Alternately, an indirect entry method may be used in which case the host master key may be entered from a non-volatile media such as a magnetic card or tape which is maintained in a secure location (safe, vault, etc.) accessible only to the security administrator. Another alternative indirect entry method may be to use a keyboard entry device, though this method is subject to human error. In any event, whichever indirect method is chosen, during initialization, the host master key may be read into and temporarily stored in the host memory and then transferred to the master key memory with the host memory entry being subsequently erased so that only one copy is present and accessible only by the cryptographic facility.

The secondary file key is a key encrypting key and since there may be numerous data files associated with the data processing network, it may not be practical or prudent to have these keys generated by a human user using some type of random experiment. Therefore, to relieve the system administrator from the burden of creating cryptographic keys, except for the single system master key, the cryptographic apparatus of the host system can be used as a pseudo random generator for generating the required secondary file keys used by the various data files of the network. In addition to the system generated secondary file keys, off line means may be used by end users to establish a private secondary file key. The cross-domain key is a secondary key encrypting key which is used as a secondary file key to allow a system file key generated at the host system in one domain to be transmitted and recovered at the host system in another domain of a multiple domain data processing system. The cryptographic apparatus of the sending host system used as a pseudo random generator, as in the case of generating secondary file keys, can also be used to generate the cross-domain key. Because there may be numerous host systems interconnected in the multiple domain communication network, it is necessary to generate a separate cross-domain key for each cross-domain file communication between each host system and the other host systems of the network. In addition to the system generated cross-domain keys, off line means may be used by end users to establish a private cross-domain key. In either event, the clear form of the system or private generated cross-domain keys must be distributed from each host system to each of the other host systems in the data processing system in a secure manner. This may be accomplished by transporting the key by courier, registered mail, public telephone, etc. The likihood of an opponent obtaining the key during transit can be lessened by transmitting different portions of the key over independent paths and then combining them at the destination. Once having properly received a valid system or private generated cross-domain key in clear form, it becomes necessary to maintain its secrecy. The manner in which this is accomplished will be described hereafter. However, once installed at the receiving host system in a protected form, the cross-domain key is used only by the receiving host system for internally transforming enciphered system file keys transmitted as a file recovery key by a sending host system into a form usable by the receiving host system to carry out cryptographic operations.

Because the ciphering algorithm used is not secret, the degree of protection that can be derived from a cryptographic system ultimately depends upon the security of the cryptographic keys. Therefore, the objectives of key management are: (1) cryptographic keys should never occur in clear form outside the cryptographic device, except under secure conditions during the period when keys are originally distributed and installed or when stored in a secure place such as a safe, vault or similar location for backup or recovery and (2) no cryptographic operation, or combination thereof, using any cryptographic quantities which are routinely stored or routed through the system, or derived therefrom, should permit clear keys to be recoverable outside the cryptographic device. Therefore, in keeping with the first objective, if the system generated secondary file keys are to be stored at the host system they must be protected by being enciphered under another key. Accordingly, to prevent exposing these keys in clear form, a multiple master key approach is adapted, by the present invention, in which a second master key which may be a variant (KMH2) of the host master key (KMH$\phi$) is used to encipher the secondary file keys by an Encipher Master Key function (EMK2), which will be described in greater detail hereafter. In the embodiment of the present invention, only the host master key resides in clear form within the cryptographic device. Accordingly, when an EMK2 function is to be performed, the host master key is read out of the master key memory and by selected inversion of certain bits of the host master key the variant KMH2 is derived for use in enciphering the secondary file key. By enciphering the secondary file keys under the variant of the host master key, the enciphered secondary file keys may be stored in a cryptographic data set until required for use in a cryptographic operation and the first objective of key management is obtained, namely, that no key shall occur in clear form. It should be noted that although the relationship between the host master key and its variant are known i.e. which bits are inverted, the cryptographic strength is not weakened because there is no way to use this information to arrive at useful key information because of the complexity of the algorithm.

In the case of a multiple domain data processing system, a cross-domain key generated at a host system in one domain for cross-domain file communication with a host system in another domain of the network is communicated in a secure manner to the host system in the other domain and visa versa so that a pair of cross-domain keys is shared between the two host systems. Thus, the cross-domain key generated at the host system in the one domain is designated as the sending cross-domain key for the one domain and as the receiving cross-domain key in the other domain whereas the cross-domain key generated at the host system in the other domain is designated as the sending cross-domain key for the other domain and as the receiving cross-domain key in the one domain. Therefore, each host system must store two cross-domain keys for cross domain file communications between itself and another host system of the network, one being the cross-domain key it generated and designated as the sending cross-domain key and the other being a cross-domain key it received from the other host system and designated as the receiving cross-domain key. Since, these pairs of keys are to be stored at each host system, they must also be protected from being exposed in clear form. This can be accomplished, as in the case of secondary file keys, by having them enciphered under another key.

A sending cross-domain key when system generated in a sending host system is used in a privileged transformation process, termed an RFMK function which will be described in greater detail hereafter, to reencipher a system file key from encipherment under the host master key to encipherment under the sending cross-domain key for use as a file recovery key for recovering the data file at the receiving host system. At the receiving host system, the receiving cross-domain key is used in a different type of privileged transformation process, termed an RTMK function which will be described in greater detail hereafter, to reencipher the received system file key from encipherment under the receiving cross-domain key to encipherment under the receiving host master key. In order to achieve cryptographically strong key management, these privileged transform processes should be unidirectional i.e. the transform process should be irreversible at the sending host system and decipherable only at the receiving host system. Unidirectionality is achieved in the present invention by a multiple master key technique in which a first key encrypting key, which may be a first variant (KMH1) of the sending host master key (KMH$\phi$), is used to encipher the sending cross-domain key by the Encipher Master Key function (EMK1) and a second key encrypting key, which may be a second variant (KMH2) of the sending host master key (KMH$\phi$), is used to encipher the receiving cross-domain key by an Encipher Master Key function (EMK2), which will be described in greater detail hereafter. The EMK2 function is similar to the EMK1 function in that the master key of the associated host system is read out and by selected inversion of certain bits, different from those inverted by the EMK1 function, of the host master key, the variant KMH2 is derived for use in enciphereing the receiving cross-domain key. By enciphering the sending cross-domain key under the first variant of the host master key and by enciphering the receiving cross-domain key under the second variant of the host master key, the enciphered cross-domain keys, now in protected form, may be stored in a cryptographic data set until required for use in the transform processes.

Unidirectionality is made possible because the output of the sending RFMK transformation function, the system file key enciphered under the sending cross-domain key, is usable only by the receiving RTMK transformation function. Thus, the sending host system can reencipher the system file key from encipherment under the sending host master key to encipherment under the sending cross-domain key because the sending cross-domain key enciphered under the first variant of the sending host master key is available at the sending host system, but it cannot reencipher the system file key from encipherment under the first variant of the sending cross-domain key to encipherment under the sending host master key because the sending cross-domain key enciphered under a second variant of the sending host master key is not available at the sending host system. Inversely, the receiving host system can reencipher the system file key from encipherment under the sending cross-domain key to encipherment under the receiving host master key because the sending cross-domain key enciphered under the second variant of the receiving host master key is available at the receiving host system, but it cannot reencipher the system file key from encipherment under the receiving host master key to encipherment under the sending cross-domain key because the sending cross-domain key is not available at the receiving host system.

In a multiple domain network where cross domain file communication is to be established using a private cross domain key, an RTMK transformation function is required to reencipher the system file key from encipherment under the private cross domain key to encipherment under the sending host master key, as will be described in greater detail hereafter. To perform this transform process the private cross domain key enciphered under the second variant of the sending host master key must be available at the sending host system. Additionally, the private cross domain key is enciphered under the second variant of the associated host system master key to permit this transform process to be performed. The EMK2 function may be used to encipher the private cross domain key under the second variant of the host master key and the private cross domain key, now in protected form, may also be stored in the cryptographic data set until required in the transformation process.

System generated primary file keys, i.e. system file keys, are time variant keys which are dynamically generated for each file to be created and are used to protect file data. Since there may be numerous data files created it is impractical to have these keys generated by a human user. Therefore, the cryptographic apparatus of the host system may be used as a pseudo-random generator for generating, as each data file is to be created, a pseudo-random number which, in keeping with the objective that cryptographic keys should never occur in the clear, may be defined as being a system file key enciphered under a host key encrypting key. In a multiple domain network when cross domain file communication is to be established involving a data file created at one host system for recovery only at a designated other host system, the generated random number is defined as being the file key enciphered under the host master key. On the other hand, when cross domain communication is to be established using a private cross domain key, the generated random number is defined as being the system file key enciphered under the private cross domain key associated with the application program of the sending host system.

In other private cryptographic systems involving multiple domain systems, where the end users use a private protocol which is unknown to the system, key selection, management and data transfer operations are performed without system knowledge that cryptography is being performed. In such arrangements, the end users may define a private protocol using a mutually agreed upon private primary file key, i.e. a private system file key. In order to meet the objective that no cryptographic key appear in clear form, the private system file key must also be protected. This is accomplished, in this case, by enciphering the private system file key under the host master key by an Encipher Master Key function (EMK$\phi$), which will be described in greater detail hereafter.

The following table summarizes the protection provided for the various cryptographic keys used at a representative host system in a multiple domain data processing system by a multiple master key arrangement which uses variants of the host master key.

| NAME | KMH1 | KMH2 | EXPLANATORY NOTE |
|---|---|---|---|
| FILE 1 | | $E_{KMH2j}KNF_i^j$ | |
| . | | . | |
| .. | | . | |
| . | | . | |
| FILE i | | $E_{KMH2j}KNF_i^j$ | File Keys |
| . | | . | |
| . | | . | |
| . | | . | |
| FILE n | | $E_{KMH2j}KNF_n^j$ | |
| HOST j | $E_{KMH1j}KNF^{jk}$ | $E_{KMH2j}KNF^{kj}$ | Sending and Receiving Cross Domain |
| HOST k | $E_{KMH1k}KNF^{kj}$ | $E_{KMH2k}KNF^{jk}$ | Keys |
| HOST j | | $E_{KMH2j}KNFP^{jk}$ | Private |
| . | | . | |
| . | | . | File |
| HOST k | | $E_{KMH2k}KNFP^{jk}$ | Keys |

While it is efficient to use variants of a host master key to provide protection for the various cryptographic keys used in the system, it is well within the skill of the art to provide separate master keys instead of variants of a single master key. This could be accomplished by providing separate master key memories each being loaded with a master which is different from each other and being accessed when needed. While this is a viable alternative, it would substantially increase the cost of the host data security device as opposed to using a single master key memory and obtaining variants as needed.

MULTIPLE DOMAIN DATA PROCESSING NETWORKS

A modern day data processing system consist of a host system which includes a host processor, host memory, channel and its associated resources such as the host programs and locally attached terminals and data files. As the size of the data processing system increases other host systems may be brought into the data processing system to provide multiple domain systems with each host system having knowledge of and managing its associated resources which make up a portion or domain of the processing system. A representative multiple domain processing system is shown in FIG. 1 with the host and its associated resources shown in block form. While the particular manner in which the host system is implemented is not critical to the present invention, the block diagram of FIG. 1 shows the data flow and control relationships of a representative host system arrangement. The host includes a programmable processor 1 operationally connected to a memory 2 which provides storage for data and the programs which are utilized to control the system and a channel 3 which controls the transfer of data between input/output devices and the processor 1. Channel 3 is connected to the processor 1 and memory 2 and via a channel I/O interface, with control units such as control unit 4 capable of controlling an input/output device which may be a printer, control unit 5 capable of controlling a cluster of input/output devices which may be display or printer type of devices, control unit 6 capable of controlling a mass storage device, communication controller 7 capable of two-direction control that links the Host$^j$ system to communication lines connected to Host$^k$ and Host$^l$ systems, control unit 9 capable of controlling a plurality of magnetic tape units, and control unit 10 capable of controlling a plurality of disk files.

A data file may be created at the Host$^j$ system for storage on one of the magnetic tape units or disks for recovery at Host$^k$ system or Host$^l$ system. The data file may be read at the Host$^j$ system and communicated by teleprocessing means over a communication line to either of the other host systems with communication security provided by the technique disclosed in the aforementioned copending application Ser. No. 857,731. Alternatively, the magnetic tape unit or disk may be of a portable nature which permits it to be transported by a human being, registered mail or the like from Host$^j$ system to the designated receiving host system, represented by the dotted line connection between the host systems, where it may then be loaded and the data file recovered at the receiving host system.

The collection of data and control lines connected between the channel and I/O control units is commonly referred to as the channel I/O interface providing an information format and signal sequence common to all the I/O control units. The I/O interface lines generally include a data bus out which is used to transmit device addresses, commands and data from the processor to the I/O control unit; a data bus in which is used to transmit device identification, data or status information from the I/O control unit to the channel 3 and tag signal lines which are used to provide signals identifying an I/O operation, the nature of information on the data bus and parity condition. Since each I/O control unit has a unique electrical interface, device adapters are generally provided to allow device connection to the common I/O interface. All I/O data transfers between the processor and the attached control units may be performed in a programmed input/output (PIO) mode on a 1 byte per I/O instruction basis.

Into this organization of a general purpose host system is integrated a data security device 11. The host data security device 11 and manner in which it performs cryptographic operations is described in detail in the co-pending application Ser. No. 857,531, filed Dec. 5, 1977 entitled "Cryptographic Communication Security for Multiple Domain Networks", by W. F. Ehrsam et al. FIG. 2 shows, in block diagram form, the major elements of the data security device (DSD) 11 which includes a crypto device 12, a master key (MK) memory 13, a DSD adapter 14 which connects to the I/O interface and a manual entry device 15 for manually loading a host master key into the MK memory 13. Either one of two methods can be used for writing a host master key into the MK memory 13. The first method for writing the host master key into the MK memory 13 is achieved under program control. In this method, an I/O device having a keyboard, magnetic stripe card reader or the like, may use such elements to cause the host master key to be stored in the host memory 2 as in the case of conventional data entry. Subsequently, under program control, the host master key may be read from the host memory 2 to the MK memory 13 of the DSD in a manner as described in greater detail in the aforementioned co-pending application. The other method of writing the host master key into the MK memory 13 consists of manually writing the host master key into the MK memory 13 by means of individual toggle or rotary switches wired to produce binary coded hex digits as described in greater detail in the aforementioned co-pending application. To enable master key writing into the MK memory 13 by either method, an enable write key (EW) switch is provided which is initially turned on when a write master key operation is initiated and turned off at the end of write master key operation. To prevent the key from being changed by unauthorized persons, the EW switch operation may be activated by a physical key lock arrangement.

The DSD adapter 14 serves a dual function namely, providing adapter functions for DSD connection to the I/O interface and control functions for the DSD.

The I/O interface provides the DSD adapter 14 with overall direction, gives it cipher keys to be used, presents it with data to be processed and accepts the processed results. Overall direction is achieved by use of operation commands which are decoded and subsequently provide control in properly timed sequences of signals to carry out each command. These signals are synchronized with the transfer of data in and out. The DSD adapter 14 also controls the placing of cipher keys in the crypto device 12 and directs the crypto device in the enciphering and deciphering operations.

The MK memory 13 in a non-volatile 16×4 bit random access memory (RAM) which is battery powered to enable key retention when host power may not be present. The host master key consists of eight master key bytes (64 bits) each of which consists of seven key bits and one parity bit.

The crypto device 12 is the heart of the DSD hardware for performing enciphering and deciphering operations. The crypto device 12 performs encipher/decipher operations on a block cipher basis in which a message block of 8 data bytes (64 bits) is enciphered/deciphered under control of a 56 bit cipher working key to produce an enciphered/deciphered message block of 8 data bytes. The block cipher is a product cipher function which is accomplished through successive applications of a combination of non-linear substitutions and transpositions under control of the cipher working key. Sixteen operations, defined as rounds, of the product cipher are executed in which the result of one round serves as the argument of the next round. This block cipher function operation is more fully described in the aforementioned U.S. Pat. No. 3,958,081. A basic encipher/decipher operation of a message block of data starts with the loading of the cipher key from the host memory 2. This key is generally stored under master key encipherment to conceal its true value. Therefore, it is received as a block of data and deciphered under the master key to obtain the enciphering/deciphering key in the clear. The clear key does not leave the crypto device 12 but is loaded back in as the working key. The message block of data to be enciphered/deciphered is then transferred to the crypto device 12 and the cipher function is performed, after which the resultant message block of enciphered/deciphered data is transferred from the crypto device 12 to the host memory 2. If subsequent encipher/decipher functions are to be performed using the same working key, there is no need to repeat the initial steps of loading and deciphering the working key as it will still be stored in the working key register.

The crypto device 12 includes duplicate crypto engines operating in synchronism to achieve checking by 100% redundancy. Referring now to FIG. 3, one of the crypto engines is shown in simplified block form with a heavy lined border signifying a secure area. The crypto engine 16 contains a 64 bit input/output buffer register 17 divided into upper and lower buffer registers 18 and 19 of 32 bits each. The buffer register 17 is used in a mutually exclusive manner for receiving input data on a serial by byte basis from the bus in, termed an input cycle, and for providing output data in a serial by byte basis to the bus out, termed an output cycle. Thus, during each input cycle a message block of eight data bytes is written into the buffer register 17 from the host memory 2 while during each output cycle a message block of eight processed data bytes is read from the buffer register 17 to the host memory 2. Serial outputs of the buffer register 17 are also applied as serial inputs to the working key register 20 and a parity check circuit 21, the latter being controlled to be effective only when a 64 bit clear cipher key is to be loaded directly into the working key register 20 from the host memory 2 via the buffer register 17. Only 56 of the 64 bits are stored in the working key register 20, the 8 parity bits being used only in the parity check circuit 21. The buffer register 17 is also provided with parallel input and output paths from and to a 64 bit data register 22 also divided into upper and lower data registers 23 and 24 of 32 bits each. The upper and lower data registers 23 and 24 each possesses parallel outputs and two sets of parallel inputs. The parallel inputs to the lower data register 24 being from the lower buffer register 19 and the upper data register 23 while the parallel inputs to the upper data register being from the upper buffer register 18 and from the lower data register 24 after modification by the cipher function circuits 25. The 64 bit master key is inputted to the crypto engine 16 on a serial by byte basis with each byte being checked for correct parity by the parity check circuit 26. As in the case of the cipher key transfer from the buffer register 17 to the working key register 20, only 56 of the 64 bits are stored in the key register 20, the 8 parity bits being used only in the parity check circuit 26. During the loading process, the key register 20 is configured as seven 8-bit shift right registers to accommodate the eight 7-bit bytes received from the MK memory 13 (or the buffer register 17).

When the working key is used for enciphering, the key register 20 is configured as two 28 bit recirculating shift left registers and the working key is shifted left, in accordance with a predetermined shift schedule, after each round of operation of the cipher function so that no set of key bits once used to perform a cipher operation is used again in the same manner. Twenty-four parallel outputs from each of the two shift registers (48 bits) are used during each round of the encipher operation. The shift schedule provided is such that the working key is restored to its initial beginning position at the end of the complete encipher operation.

When the working key is used for deciphering, the key register 20 is configured as two 28 bit recirculating shift right registers and the working key is shifted right in accordance with a predetermined shift schedule, after each round of operation of the cipher function, so that again no set of key bits is used again. As in the enciphering operation, twenty-four parallel outputs from each of the two shift registers (48 bits) are used during each round of the decipher operation. The shift schedule provided in this case is also such that the working key is restored to its initial beginning position at the end of the complete decipher operation.

The cipher function circuits 25 perform a product cipher through successive application of a combination of non-linear substitutions and transpositions under control of the cipher working key. Sixteen rounds of the product cipher are executed in which the results of one round serves as the argument of the next round. Deciphering is accomplished by using the same key as for enciphering but with the shift schedule for shifting the key being altered so that the deciphering process is the reverse of the enciphering process, thus undoing in reverse order every step that was carried out during the enciphering process. During each round of the cipher function, the data contents of the upper data register 23, designated R, is enciphered under control of the working key, designated K, with the result being added modulo-2 to the contents of the lower data register 24, designated L, the operation being expressed as $L \oplus f(R,K)$. At the end of the cipher round, the contents of the upper data register 23 is parallel transferred to the lower data register 24 while the output of the cipher function circuits 25 is parallel transferred to the upper data register 23 to form the arguments for the next round of the cipher function. After a total of sixteen rounds, which completes the total cipher function, the contents of the upper data register 23 is parallel transferred to the upper buffer register 18 while the output of the cipher function circuits 25 is parallel transferred to the lower buffer register 19. The transformed data contents of the buffer register 17 is then outputted via the bus out to the host memory 2.

DSD COMMANDS AND ORDERS

Input/output operations of an I/O device are generally directed by the execution of I/O instructions. In executing an I/O instruction, the channel generally provides an address field for addressing the I/O device, a command field for designating the operation to be performed and another address field for addressing the data field in memory from which data is fetched or to which data is stored. The data security device 11 of the present invention is responsive to seven types of commands from the processor as shown in the following table including the mnemonic and bit pattern of the command:

| COMMAND FORMAT | | | | | | | | | |
|---|---|---|---|---|---|---|---|---|---|
| | | Command Field | | | | | | | |
| Name | Mnemonic | 0 | 1 | 2 | 3 | 4 | 5 | 6 | 7 |
| 1. Reset Adapter | RST | — | — | — | — | 0 | 0 | 1 | 0 |
| 2. Set Basic Status | SET BS | — | — | — | — | 0 | 1 | 1 | 0 |
| 3. Reset Basic Status | RST BS | — | — | — | — | 0 | 1 | 0 | 0 |
| 4. Read Basic Status | RD BS | — | — | — | — | 0 | 1 | 1 | 1 |
| 5. PIOW Data | PIOW | — | — | — | — | 1 | 1 | 0 | 0 |
| 6. PIOR Data | PIOR | — | — | — | — | 1 | 1 | 0 | 1 |
| 7. Write DSD | WR DSD | w | x | y | z | 1 | 1 | 1 | 0 |

| COMMAND FORMAT | | | | | | | | | |
|---|---|---|---|---|---|---|---|---|---|
| | | -continued | | | | | | | |
| | | | | | Command Field | | | | |
| Name | Mnemonic | 0 | 1 | 2 | 3 | 4 | 5 | 6 | 7 |
| Order | | | | | | | | | |

The following is a brief description of the function of each of the commands, the operation of which is described in greater detail in the aforementioned co-pending application Ser. No. 857,534.

1. Reset Adapter (RST)—This command causes a reset signal to be created to reset all counters, flip-flops and latches in the adapter and control sections of the DSD.

2. Set Basic Status (SET BS)—This command causes those latches in a status register of the DSD that correspond to 1's in the data field to be set to 1.

3. Reset Basic Status (RST BS)—This command is similar to the SET BS command except that the status latches corresponding to 1's in the data field are set to 0.

4. Read Basic Status (RD BS)—This command causes the contents of the status latches to be applied via the data bus in to the processor.

5. PIOW Data (PIOW)—This command causes the data field to be loaded into the buffer register or the bits 0, 1, 2, and 3 of the data field to be stored in the MK memory depending on the operation to be performed.

6. PIOR Data (PIOR)—This command causes the contents of the buffer register, with correct parity, to be applied via the data bus in to the processor.

7. Write DSD Order (WR DSD)—This command uses the four high order bits of the command field to designate cipher key handling and data processing orders as shown in the following table including the mnemonic and bit pattern of the order field:

or

FUNCTION[DATA PARAMETER]→OUTPUT and when functions are combined, the notation used to describe the combined functions will be expressed as follows:

FUNCTION[KEY PARAMETER, DATA PARAMETER]→OUTPUT

The salient characteristics of host cyrptographic functions are that (1) the key parameter, is always in enciphered form and therefore must be internally deciphered by the crypto engine before the clear key is used and that (2) no function allows keys to become available in clear form. The descriptions that follow describe what each function does and how it is performed. These functions are described in greater detail in the aforementioned co-pending application Ser. No. 857,534 but a general description of these functions or combination of functions are given at this point to provide a better understanding of how various security applications may be performed. The descriptions may follow along with reference to FIG. 3 at times. In the diagrams which are referenced in the following, the cryptographic facility is shown in simplified block form for ease of understanding these operations.

Before proceeding to the descriptions of the functions, a brief general description will be given of how the manual write key operation is performed. Referring now to FIG. 4, there is shown a simplified block diagram of a manual WMK operation. In the manual WMK operation, an EW switch is set on to enable writing into the MK memory 13 after which a MW switch is closed to enable manual writing and causing the current master key to be overwritten with whatever happens to be set in the data key entry switches. Following this, 16 sets of 4 bits (64 bits) are manually written into the MK memory 13 to complete the manual WMK operation.

| ORDER FORMAT | | | | | | | | | |
|---|---|---|---|---|---|---|---|---|---|
| | | Order Field | | | | Command Field | | | |
| Name | Mnemonic | W | X | Y | Z | 4 | 5 | 6 | 7 |
| Cipher Key Handling | | | | | | | | | |
| 1. Write Master Key | WMK | 0 | 0 | 0 | 0 | 1 | 1 | 1 | 0 |
| 2. Decipher Key | DECK | 0 | 1 | 1 | 1 | 1 | 1 | 1 | 0 |
| 3. Generate Random Number | GRN | 1 | 1 | 1 | 1 | 1 | 1 | 1 | 0 |
| 4. Encipher Master Key φ | EMKφ | 1 | 1 | 0 | 0 | 1 | 1 | 1 | 0 |
| 5. Encipher Master Key 1 | EMK1 | 1 | 1 | 0 | 1 | 1 | 1 | 1 | 0 |
| 6. Encipher Master Key 2 | EMK2 | 1 | 1 | 0 | 1 | 1 | 1 | 1 | 0 |
| 7. Reencipher From Master Key | RFMK | 0 | 1 | 0 | 1 | 1 | 1 | 1 | 0 |
| 8. Reencipher To Master Key | RTMK | 0 | 1 | 1 | 0 | 1 | 1 | 1 | 0 |
| Data Processing | | | | | | | | | |
| 1. Encipher | ENC | 1 | 0 | 0 | 0 | 1 | 1 | 1 | 0 |
| 2. Decipher | DEC | 1 | 0 | 1 | 0 | 1 | 1 | 1 | 0 |

DSD FUNCTIONS

DSD cryptographic functions may be performed by combinations of the previously defined commands or by a combination of functions. These functions require an input to the cryptographic apparatus consisting of a key parameter or a data parameter. The notation used to describe these functions will be expressed as follows:

FUNCTION[KEY PARAMETER]→OUTPUT

Referring now to FIG. 5, there is shown a simplified block diagram of a write master key (WMK) function. This function is carried out by the following sequence of commands: (1) WMK and (2) 16 PIOW's. In this operation, as in the manual WMK operation, the EW switch is previously set on to enable writing into the MK memory 13. The execution of this function causes the current master key in the master key memory 13 to be over-written with whatever happens to be present as bits 0, 1, 2 and 3 on the bus in. Thereafter, the crypto engine controls are set to allow a 64 bit master key KM to be written as a key parameter into the MK memory 13 by means of 16 successive PIOW data commands with the bits 0, 1, 2 and 3 in the data fields associated with the 16 PIOW data commands constituting the new master key. The notation WMK[KM]→KM is used to describe this operation whereby the term WMK indicates the function, the contents of the brackets indicate the key parameter input to the MK memory 13 and the arrow points to the result.

Referring now to FIG. 6, there is shown a simplified block diagram of a decipher key DECK function. This function is carried out by the following sequence of commands: (1) DECK and (2) 8 PIOW's. The execution of this function sets the crypto engine controls to first allow the master key KM in the MK memory 13 to be transferred to the crypto engine 16 as the working key. After or during the master key transfer, a 64 bit data block, defined as an operational key enciphered under the master key, is loaded as a key parameter into the crypto engine 16 by means of 8 successive PIOW data commands with the successive data fields associated with the 8 PIOW commands constituting the enciphered operational key. After the key parameter loading is completed, the crypto engine 16 performs a decipher operation to obtain the cipher key in clear form. The resultant clear cipher key does not leave the crypto engine 16 but is loaded back into the key register 20 of the crypto engine 16 replacing the master key as the working key. The notation DECK[$E_{KM}KO$]→KO is used to describe this operation whereby the term DECK indicates the function, the contents of the bracket indicate the key parameter which is inputted to the crypto engine 16 and the arrow points to the result.

Figure 7:
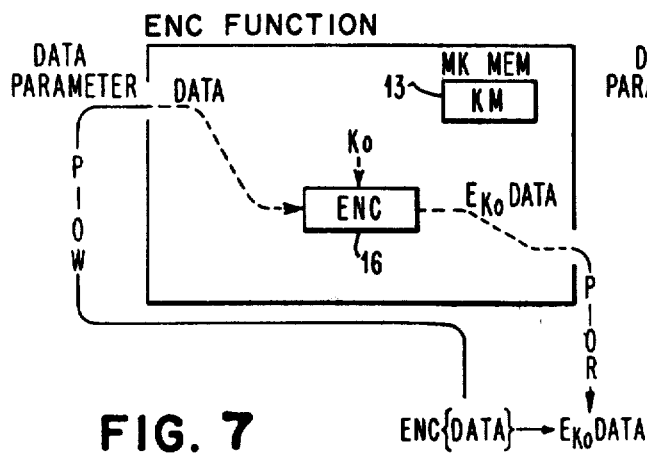
FIG. 7 illustrates in block diagram form a ENC function.

Referring now to FIG. 7, there is shown a simplified block diagram of an encipher (ENC) function. This function is carried out by the following sequence of commands: (1) ENC (2) 8 PIOW's and (3) 8 PIOR's. The execution of this function sets the crypto engine controls to the encipher mode of operation and allows a 64 bit message block of data to be loaded as a data parameter into the crypto engine 16 by means of 8 successive PIOW data commands with the successive data fields associated with the 8 PIOW commands constituting the message block of data to be enciphered. After the data parameter loading is completed, the crypto engine 16 performs an encipher operation to encipher the data parameter under the operational key presently stored in the working key register of the crypto device 16. The 64 bit enciphered result is transferred by a series of 8 PIOR commands from the crypto engine 16 for storage is designated data fields of the host memory 2. The notation ENC[DATA]→$E_{KO}$DATA is used to describe this operation whereby the term ENC indicates the function, the contents of the bracket indicate the data parameter input to the crypto engine 16 and the arrow points to the result. Additionally, so long as the crypto engine controls remain set in the encipher mode of operation, then a message which consists of multiple 8 byte blocks of data may be enciphered by the crypto engine 16 by means of an encipher command followed by a series of successive 8 PIOW data commands and successive 8 PIOR data commands for each block of data. This message encipherment may be expressed by the notation:

ENC[$DATA_1$, $DATA_2$ - - - - $DATA_N$]→$E_{KO}$($DATA_1$, $DATA_2$ - - - - $DATA_N$).

Figure 8:
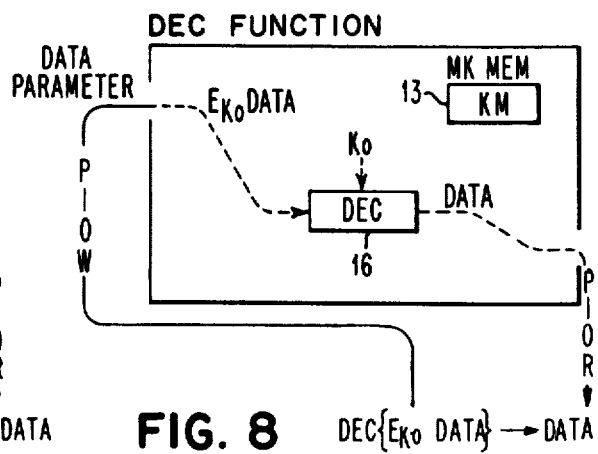
FIG. 8 illustrates in block diagram form a DEC function.

Referring now to FIG. 8, there is shown a simplified block diagram of a decipher (DEC) function. This function is carried out by the following sequence of commands: (1) DEC (2) 8 PIOW's and (3) 8 PIOR's. The execution of this function sets the crypto engine controls to a decipher mode of operation and allows a 64 bit message block of enciphered data to be loaded as a data parameter into the crypto engine 16 by means of 8 successive PIOW data commands with the successive data fields associated with the 8 PIOW commands constituting the message block of enciphered data to be deciphered. After the data parameter loading is completed, the crypto engine 16 performs a decipher operation to decipher the data parameter under control of the operational key presently stored in the working key register of the crypto engine 16. The 64 bit deciphered result is transferred by a series of 8 PIOR commands from the crypto engine 16 for storage in designated data fields of the host memory 2. The notation DEC[$E_{KO}$DATA]→DATA is used to describe this operation whereby the term DEC indicates the function, the contents of the bracket indicate the data parameter input to the crypto engine 16 and the arrow points to the results. Additionally, so long as the crypto engine controls remain set in the decipher mode of operation, then a message which consists of multiple blocks of enciphered data may be deciphered by the crypto engine 16 by means of a decipher command followed by a series of successive 8 PIOW data commands and successive 8 PIOR data commands for each block of enciphered data. This message decipherment may be expressed by the notation:

DEC[$E_{KO}$($DATA_1$,$DATA_2$ - - - - $DATA_N$)]→$DATA_1$,$DATA_2$ - - - - $DATA_N$.

Figure 9:
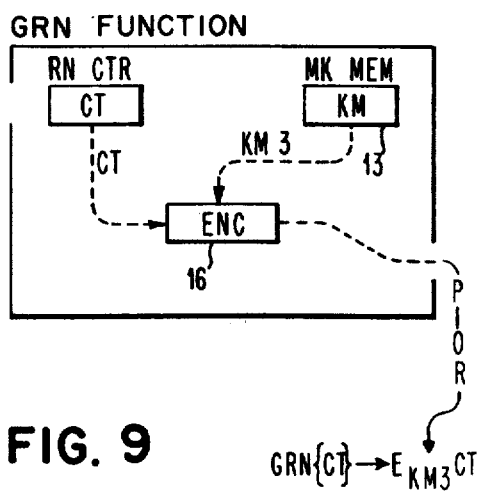
FIG. 9 illustrates in block diagram form a GRN function.

Referring now to FIG. 9, there is shown a simplified block diagram of a generate random number (GRN) function. This function is carried out by the following sequence of commands (1) GRN and (2) 8 PIOR's. Accordingly, in executing this function, the crypto engine controls are set to the encipher mode of operation and a variant KM3 of the master key KM in the MK memory 13 is transferred to the crypto engines 16 as the working key, the variant KM3 being obtained by inverting predefined bits of the master key. During the transfer of the master key variant KM3 to the crypto engine 16, a 64 bit count value CT from a non-resettable RN counter is loaded as a data parameter into the crypto engine 16. While a 64 bit RN counter is used in this operation to provide a pseudo random number, it should be apparent that it is well within the skill of the art to use a truly random number generator for generating a random value e.g. a noise generator. After the key and the data parameter loading is completed, the RN counter is stepped by one and the crypto engine 16 performs an encipher operation to encipher the data parameter CT under control of the variant KM3 of the master key presently stored in the working key register of the crypto device 16. The 64 bit enciphered result is a pseudo random number RN which is transferred by a series of 8 PIOR commands from the crypto engine 16 for storage in designated data fields of the host memory for use as a cryptographic key in a manner which will be described hereafter. The notation GRN[CT]→($E_{KM3}$CT)=RN is used to describe this operation whereby the term GRN indicates the function, the contents of the bracket indicates the data parameter input to the crypto engine 16 and the arrow points to the result.

Figure 10:
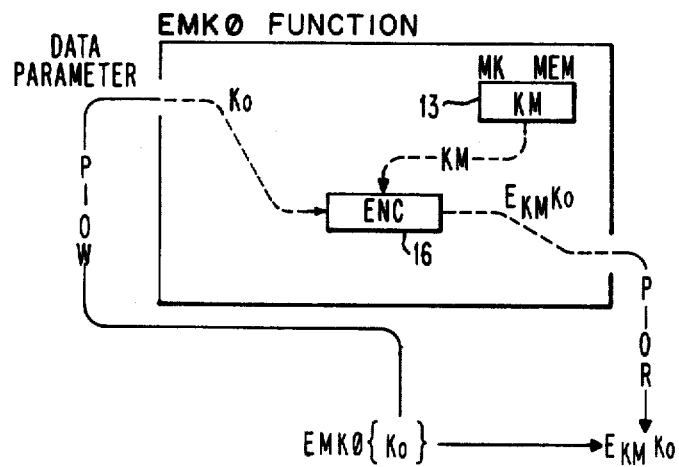
FIG. 10 illustrates in block diagram form an EMK$\phi$ function.
Figure 11:
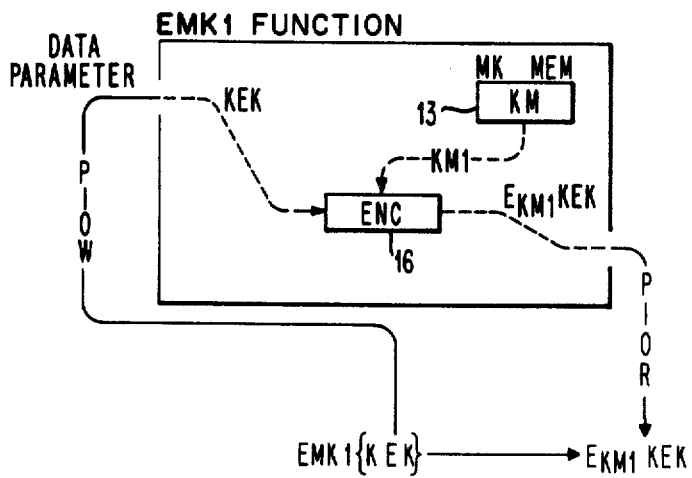
FIG. 11 illustrates in block diagram form an EMK1 function.
Figure 12:
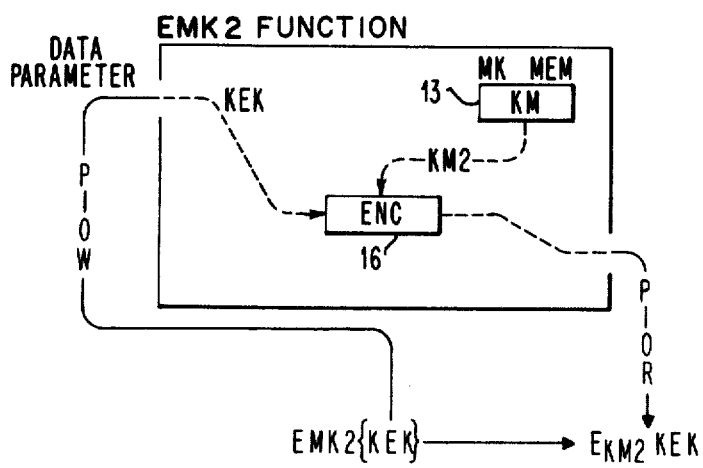
FIG. 12 illustrates in block diagram form an EMK2 function.

Referring now to FIGS. 10, 11, and 12, there are shown simplified block diagrams of the encipher master key (EMKφ, EMK1 and EMK2) function. This function is carried out by the following sequence of commands (1) EMKφ (2) 8 PIOW's and (3) 8 PIOR's; (1) EMK1 (2) 8 PIOW's and (3) 8 PIOR's and (1) EMK2 (2) 8 PIOW's and (3) 8 PIOR's. Accordingly, in executing these functions, the crypto engine controls are set to the encipher mode of operation causing, in the case of the EMKφ function, the unmodified master key in the MK memory 13 to be transferred to the crypto engine 16 as the working key, in the case of the EMK1 function, a first variant KM1 of the master key KM in the MK memory 13 to be transferred to the crypto engine 16 as the working key and in the case of the EMK2 function, a second variant KM2 of the master key KM in the MK memory 13 to be transferred to the crypto engine 16 as the working key. The first variant KM1 and second variant KM2 are obtained by inverting different predefined bits of the master key which are different from those used in the GRN function. After or during the master key transfer, a 64 bit data block, defined as an operational key, in the case of the EMKφ command, or as a secondary key encrypting key, in the case of the EMK1 and EMK2 commands, are loaded as a data parameter into the crypto engine 16 by means of 8 successive PIOW data commands with successive data fields associated with the 8 PIOW commands constituting the operational key or the secondary key encrypting key. After the key and data parameter loading is completed, the crypto engine 16 performs an encipher operation to encipher the data parameter under the master key or variant of the master key stored in the working key register of the crypto device 16. The 64 bit enciphered result is transferred by a series of 8 PIOR commands from the crypto engine 16 for storage in designated data fields of the host memory. The notation EMKφ[KO]→$E_{KM}$KO is used to describe the EMKφ operation while the notations EMK1[KEK]→$E_{KM1}$KEK and EMK2[KEK]→$E_{KM2}$KEK are used to describe the EMK1 and EMK2 operations whereby the terms EMKφ, EMK1 and EMK2 indicate the function, the contents of the bracket indicate the data parameter input to the crypto engine 16 and the arrow points to the results.

Figure 13:
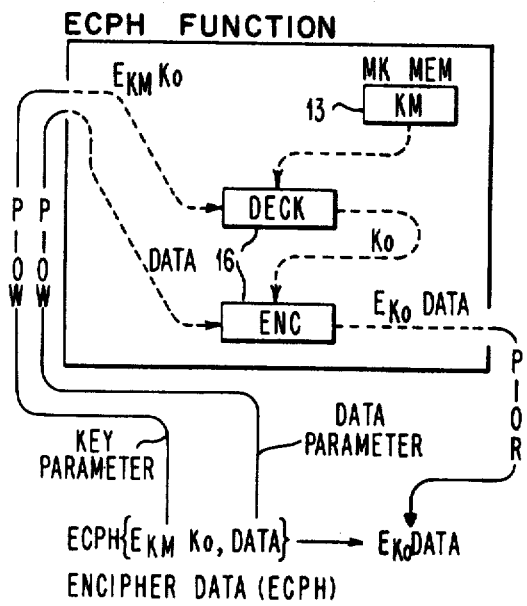
FIG. 13 illustrates in block diagram form an ECPH function.

Referring now to FIG. 13, there is shown a simplified block diagram of an encipher data (ECPH) function. This function is a combination of the DECK function and the ENC function and is carried out by the following sequence of commands: (1) DECK (2) 8 PIOW's (3) ENC (4) 8 PIOW's and (5) 8 PIOR's. Accordingly, in executing this function, the crypto engine controls are first set to the decipher key mode of operation by the DECK command causing the master key KM in the master key memory 13 to be transferred as the working key to the working key register of the crypto engine 16. After or during the master key loading, the key parameter of the function, consisting of an operational key enciphered under the master key, is loaded into the crypto engine 16 by means of 8 successive PIOW data commands. The crypto engine 16 then performs a decipher key operation to obtain the operational key in clear form which is then loaded back in as the working key of the crypto engine 16 replacing the previously loaded master key. The crypto engine controls are then set to an encipher mode of operation by the ENC command and the data parameter of the function, consisting of clear data, is loaded into the crypto engine 16 by means of 8 successive PIOW data commands. The crypto engine 16 then performs an encipher operation to encipher the data parameter under the present operational key. The enciphered result is then transferred by a series of 8 PIOR commands from the crypto engine 16 for storage in designated fields of the host memory 2. The notation ECPH[$E_{KM}$KO,DATA]→$E_{KO}$DATA is used to describe this operation whereby the term ECPH indicates the function, the contents of the bracket indicate the successive key parameter and data parameter inputs to the crypto engine and the arrow points to the result.

Figure 14:
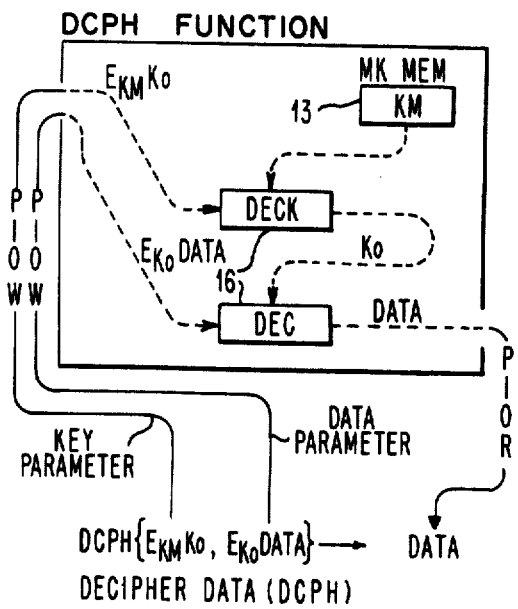
FIG. 14 illustrates in block diagram form a DCPH function.

Referring now to FIG. 14, there is shown a simplified block diagram of a decipher data (DCPH) function. This function is a combination of the DECK function and the DEC function and is carried out by the following sequence of commands: (1) DECK (2) 8 PIOW's (3) DEC (4) 8 PIOW's and (5) 8 PIOR's. The first part of this function is identical to that for the encipher data function insofar as loading an operational key in clear form as the working key of the crypto engine 16. After the operational key loading is completed, the crypto engine controls are then set to a decipher mode of operation by the DEC command and the data parameter of the function, consisting of DATA enciphered under the operational key, is loaded into the crypto engine 16 by means of 8 successive PIOW data commands. The crypto engine 16 then performs the decipher operation to decipher the data parameter under control of the present operational key. The deciphered result is then transferred by a series of 8 PIOR commands from the crypto engine 16 for storage in designated fields of the host memory 2. The notation DCPH[$E_{KM}$KO,$E_{KO}$DATA]→DATA is used to describe this operation whereby the term DCPH indicates the function, the contents of the bracket indicate the successive key parameter and the data parameter inputs to the crypto engine and the arrow points to the result.

Figure 15:
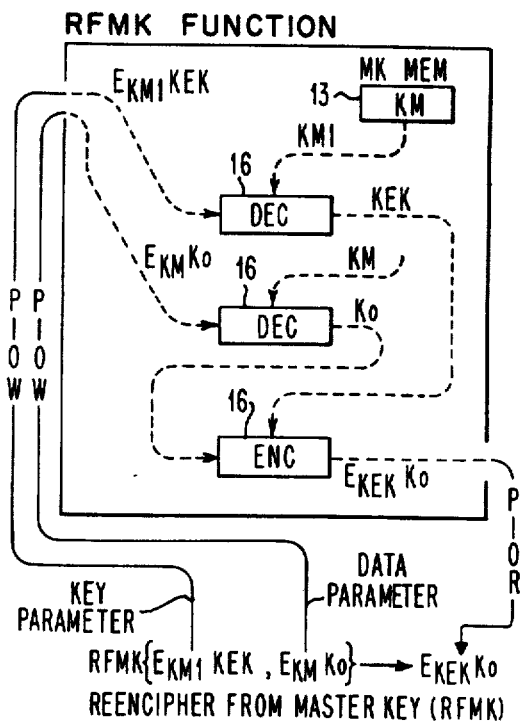
FIG. 15 illustrates in block diagram form a RFMK function.

Referring now to FIG. 15, there is shown a simplified block diagram of a reencipher from master key (RFMK) function. This is a privileged function and is carried out by the following sequence of commands: (1) RFMK, (2) 8 PIOW's, (3) 8 PIOW's and (4) 8 PIOR's. Accordingly, in executing this function, the crypto engine controls are first set to the decipher mode of operation by the RFMK command and a variant KM1 of the master key KM in the KM memory 13 is transferred to the crypto engine 16 as the working key, the variant KM1 being obtained by inverting the same predefined bits of the master key as in the EMK1 function. During or after the transfer of the master key variant KM1 to the crypto engine 16, a 64 bit data block, defined as a key encrypting key enciphered under the same variant of the master key is loaded as a key parameter to the crypto engine 16 by means of 8 successive PIOW data commands with the successive data fields associated with the commands constituting the enciphered key encrypting key. After the key parameter loading is completed, the crypto engine 16 performs a decipher operation to obtain the key encrypting key in clear form. The resultant clear key encrypting key does not leave the crypto engine 16 but is retained, with half the resultant clear key available at the upper data registers 23 of the crypto engine 16 and the other half available at the cipher function circuits 25. With the crypto engine control still set for the decipher mode of operation, a special key operation is now performed in which a 64 bit data block, defined as an operational key enciphered under the master key, is loaded as a data parameter into the buffer register 17 of the crypto engine 16 by means of 8 successive PIOW data commands with the successive data fields associated with the commands constituting the enciphered operational key. After the data parameter loading is completed, the contents of the buffer register 17 is transferred to the data register 22 of the crypto engine 16 while at the same time the contents of the upper data register 23 and the output of the cipher function circuits 25 are transferred to the buffer register 17 of the crypto engine 16. By this swapping action, the key encrypting key resulting from the first decipher operation now resides in the buffer register 17 of the crypto engine 16 while the enciphered operational key now resides in the data register 22 of the crypto engine 16. Because of the fact that a special key operation is being performed, the crypto engine control allows the master key KM in the master key memory 13 to now be transferred to the crypto engine 16 as the working key. After the master key loading is completed, the crypto engine 16 performs a second decipher operation to obtain the operational key in clear form. The resultant clear operational key does not leave the crypto engine 16 but is retained, with half of the resultant clear key available at the upper data register 23 of the crypto engine 16 and the other half available at the cipher function circuits 25. At this time, a special encipher operation is initiated with the crypto engine controls being set for an encipher mode of operation and the half of the clear operational key at the cipher function circuits 25 is transferred to the lower data register 24 so that the clear operational key is now fully available in data register 22. The key encrypting key resulting from the first decipher operation and presently residing in the buffer register 17 of the crypto engine 16 is now loaded as a working key into the key register 20 of the crypto engine 16. After key register loading operation is completed, the crypto engine 16 performes an encipher operation to encipher the operational key under the key encrypting key to complete the reencipherment function by which the operational key enciphered under the master key is now enciphered under the key encrypting key. The reenciphered result is transferred by a series of 8 PIOR commands from the crypto engine 16 for storage in designated data fields of the host memory. The notation RFMK[$E_{KM1}$KEK,$E_{KM}$KO]→$E_{KEK}$KO is used to describe this operation whereby the term RFMK indicates the function, the contents of the brackets indicates the successive key parameter and data parameter inputs to the crypto engine and the arrow points to the results.

Figure 16:
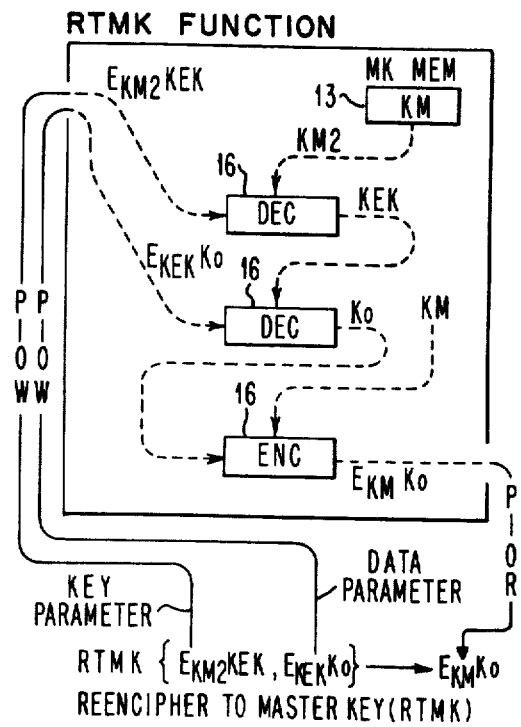
FIG. 16 illustrates in block diagram form a RTMK function.

Referring now to FIG. 16, there is shown a simplified block diagram of a reencipher to master key (RTMK) function. This is a privileged function and is carried out by the following sequence of commands: (1) RTMK, (2) 8 PIOW's, (3) 8 PIOW's and (4) 8 PIOR's. Accordingly, in executing this function the crypto engine controls are first set to the decipher mode of operation by the RTMK command and a variant KM2 of the master key KM in the MK memory 13 is transferred to the crypto engine 16 as the working key, the variant KM2 being obtained by inverting the same predefined bits of the master key as in the EMK2 function. During or after the transfer of the master key variant KM2 to the crypto engine 16, a 64 bit data block, defined as a key encrypting key enciphered under the same variant of the master key, is loaded as a key parameter into the crypto engine 16 by means of 8 successive PIOW data commands with the successive data fields associated with the 8 PIOW commands constituting the enciphered key encrypting key. After the key parameter loading is completed, the crypto engine 16 performs a decipher operation to obtain the key encrypting key in clear form. The resultant clear key encrypting key does not leave the crypto engine 16 but is loaded back into the key register 20 of the crypto engine 16 replacing the variant KM2 of the master key as the working key. With the crypto engine control still set for the decipher mode of operation, a second decipher operation is now performed in which a 64 bit data block, defined as an operational key enciphered under the same key encrypting key as is in the key register 20 of the crypto engine 16, is loaded as a data parameter into the crypto engine 16 by means of 8 successive PIOW data commands with the successive data fields associated with the command constituting the enciphered operational key. After the data parameter loading is completed, the second decipher operation is performed to obtain the operational key in clear form. The resultant clear operational key does not leave the crypto engine 16 but is retained in the buffer register 17 of the crypto engine 16. At this time, a special key operation is initiated to allow the master key KM in the MK memory 13 to now be transferred to the crypto engine 16 as the working key. After the master key loading is completed, the clear operational key, presently stored in the buffer register 17 of the crypto engine 16, is transferred to the data register 22 of the crypto engine 16 and a special encipher operation is initiated to set the crypto engine controls for an encipher mode of operation. The crypto engine 16 now performs an encipher operation to encipher the operational key under the host master key to complete the reencipherment function by which the operational key enciphered under the key encrypting key is reenciphered to the operational key enciphered under the host master key. The reenciphered result is transferred by a series of 8 PIOR commands from the crypto engine 16 for storage in designated data fields of the host memory. The notation RTMK[$E_{KM2}$KEK,$E_{KEK}$KO]→$E_{KM}$KO is used to describe this operation whereby the term RTMK indicates the function, the contents of the bracket indicates the key parameter and data parameter input to the crypto engine and the arrow points to the result.

FILE SECURITY APPLICATIONS

The previous section provides a description of the various basic function, command and order capabilities of a host system having a data security device capable of performing a variety of cryptographic operations. Accordingly, the following descriptions will provide an explanation of how such a host system may be used in various file security applications involving a multiple domain data processing system. While the diagrams used to illustrate these applications are simplified block diagrams, it should be understood that the processing system represented by these diagrams is far more complex than that shown. However, this type of representation is used merely to simplify and aid in the understanding of the cryptographic applications to be described. It would be further understood that each host system contains a full complement of known programming support including an operating system, application programs, a storage access method which, in the present case, directs the transmission of file data between a host system and the storage media on which it is stored.

FILE SECURITY IN MULTIPLE DOMAIN SYSTEMS

Figure 17:
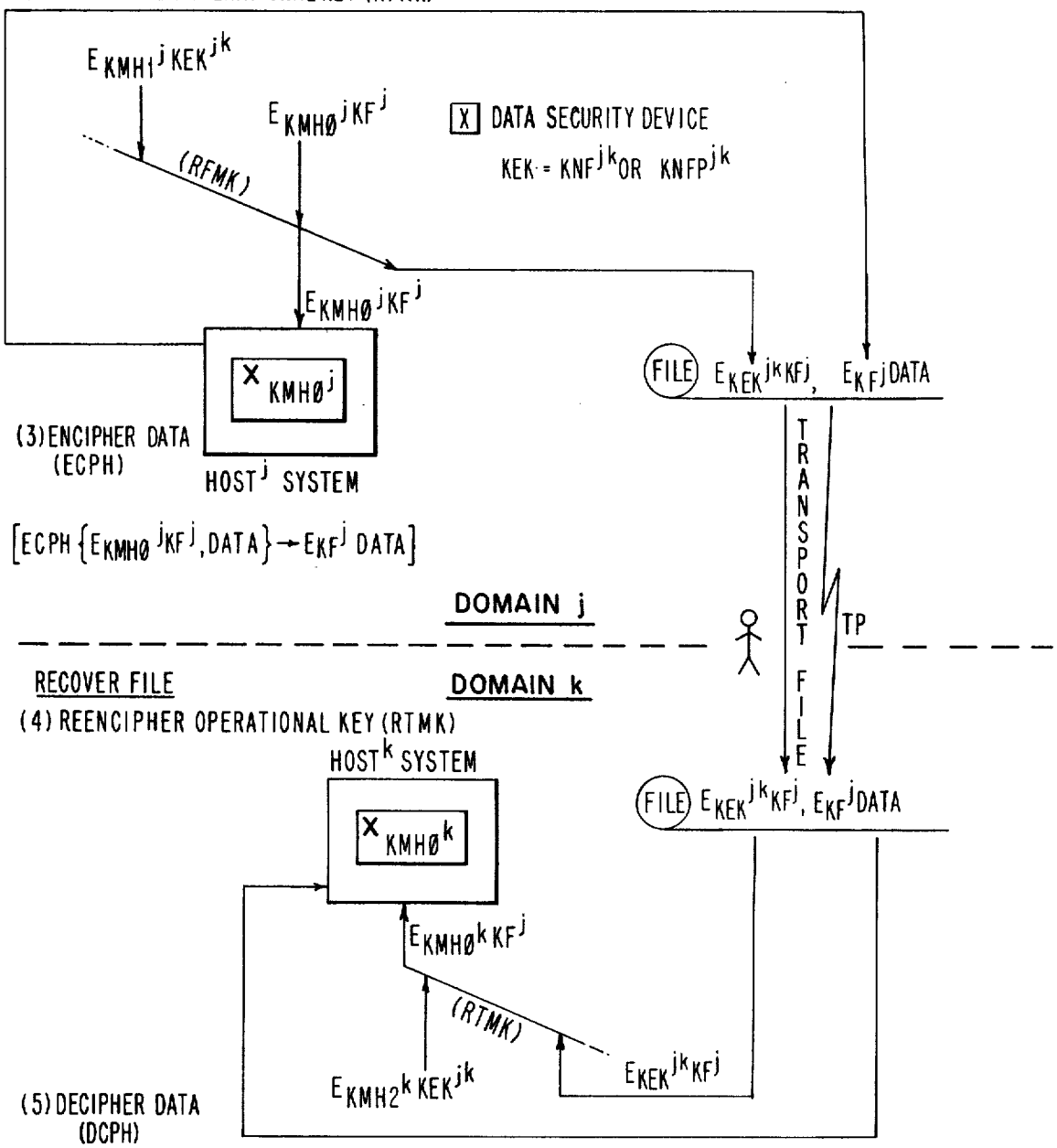
FIG. 17 is a block diagram illustrating the basic concepts of cryptographic file security in a multiple domain data processing system.

Referring now to FIG. 17, there is shown a simplified conceptual block diagram of a multiple domain data processing system comprising a first $Host^j$ system having a data security device and a locally attached storage media such as a magnetic tape or disc for storing data files and a second $Host^k$ system having a data security device and a locally attached storage media which is transported from the $Host^j$ system for recovery at the $Host^k$ system.

At host system initialization time, primary key encrypting keys $KMH\phi^j$ and $KMH\phi^k$ are generated in some random manner, as by coin or dice throwing, and then written into the MK memory of the respective host DSD's. Following this, secondary file key encrypting keys e.g. $KEK^{jk}$ and $KEK^{kj}$ are generated in clear form which if system generated are designated as cross-domain keys $KNF^{jk}$ and $KNF^{kj}$ or if privately generated, are designated as $KNFP^{jk}$ and $KNFP^{kj}$. The clear cross-domain keys are then distributed in a secure manner, as by courier, registered mail, public telephone, etc. to authorized users at each host system. At the $Host^j$, the $Host^j$ cross-domain key is protected by being enciphered under the first variant of the $Host^j$ master key as $E_{KMH1j}KEK^{jk}$ by an Encipher Master Key (EMK1) function and the $Host^k$ cross-domain key is protected by being enciphered under the second variant of the $Host^j$ master key as $E_{KMH2j}KEK^{kj}$ by an Encipher Master Key (EMK2) function. At the $Host^k$, the $Host^k$ cross-domain key is protected by being enciphered under the first variant of the $Host^k$ master key as $E_{KMH1k}KEK^{kj}$ by an Encipher Master Key (EMK1) function and the $Host^j$ cross-domain key is protected by being enciphered under the second variant of the $Host^k$ master key as $E_{KMH2k}KEK^{jk}$ by an Encipher Master Key (EMK2) function. Following the encipherment of the cross-domain keys, they are written out to a cryptographic data set for storage until they are needed for a cryptographic operation.

To establish a file recovery key between $Host^j$ system and $Host^k$ system, the next step is to generate a data encrypting key as the common operational key KF. This is initiated at one of the host systems, as for example $Host^j$, by a procedure in which a pseudo random number is generated and defined as being the system file key enciphered under the $Host^j$ master key $E_{KMH\phi j}KF^j$. This is in keeping with the rule that no key shall ever appear in the clear. The enciphered system file key is retained at the $Host^j$ system for an encipher operation in creating the data file. Additionally, in order to distribute the system file key from the sending $Host^j$ to the receiving $Host^k$, $Host^j$, using the enciphered cross-domain key $E_{KMH1j}KEK^{jk}$ and the enciphered session key $E_{KMH\phi j}KF^j$, performs a privileged RFMK transformation function which reenciphers the system file key from encipherment under the $Host^j$ master key to encipherment under the sending cross-domain key i.e. from $E_{KMH\phi j}KF^j$ to $E_{KEK^{jk}}KF^j$ as the file recovery key.

Now having generated the enciphered system file key, $E_{KMH\phi j}KF^j$, the $Host^j$ system can encipher data for the data file by performing the encipher ECPH function $ECPH[E_{KMH\phi j}KF^j, DATA] \rightarrow E_{KF^j}DATA$. In executing this function, a decipher key operation $DECK-(E_{KMH\phi j}KF^j) \rightarrow KF^j$ is first performed to obtain the file key in clear form as the working key, after which an encipher data operation $ENC(DATA) \rightarrow E_{KF^j}DATA$ is performed on $Host^j$ plaintext to obtain $Host^j$ ciphertext for storage as the data file. Following the completion of the encipher data operation, the parameter $E_{KMH\phi j}KF^j$ is erased from the host memory to prevent unauthorized decipherment of the enciphered data. This could be accomplished if an unauthorized person obtained a copy of the data file containing $E_{KF^j}DATA$ and a copy of $E_{KMH\phi j}KF^j$ if it were retained in the $Host^j$ memory by performing a decipher DCPH function $DCPH[E_{KMH\phi j}KF^j, E_{KF^j}DATA] \rightarrow DATA$. By erasing the parameter $E_{KMH\phi j}KF^j$, which is no longer needed after the data file is created, this exposure is eliminated.

Having now obtained the file recovery key $E_{KEK^{jk}}KF^j$ and having enciphered the $Host^j$ data under the file key $E_{KF^j}DATA$, the $Host^j$ system now causes the file recovery key, as header information, together with the enciphered data $E_{KF^j}DATA$ to be written on the secondary storage media as the data file.

With this arrangement, the sensitive data is now protected and the file key under which it is protected is also protected and kept as header information with the enciphered data to permit recovery of the data file at the $Host^k$ system. The protected data file may now be transported by a courier, registered mail or the like or by teleprocessing means to the $Host^k$ system.

It should be noted that the file recovery key was created as the operational key or primary file key enciphered under a host key encrypting key i.e. $KEK^{jk}$ rather than under the host master key. This enciphered file key is then used as header information in the data file. There are a number of advantages to this arrangement, namely, (1) if the host master key is changed there is no need to change the header information whereas if the file key is enciphered under the host master key, it would be necessary to change the header information everytime the host master key is changes, (2) by using a key encrypting key other than the $Host^j$ system master key there is no need to reveal the $Host^j$ system master key to the $Host^k$ system and (3) if an unauthorized person obtained access the the $Host^j$ system, he must still get access to the secondary file key enciphered under the appropriate variant of the host master key $E_{KMH2j}KEK^{jk}$ in order to perform the RTMK transformation function, which is itself a privileged function, to obtain the system file key enciphered under the $Host^j$ system master key, $E_{KMH\phi j}KF^j$, for use in the non-privileged decipher DCPH function $DCPH[E_{KMH\phi j}KF^j, E_{KF^j}DATA]$ to obtain the file data in clear form.

However, the enciphered key encrypting key is not available in the form $E_{KMH2}KEK^{jk}$ at the $Host^j$ system but rather in the form $E_{KMH1}KEK^{jk}$ which therefore prevents this form of attack whereas, if the file key was enciphered under the host master key $KMH\phi^j$ rather than the key encrypting key $KEK^{jk}$ and an unauthorized person obtained access to the host system he need only perform the nonprivileged decipher DCPH function $DCPH[E_{KMH\phi j}KF^j, DATA] \rightarrow DATA$ to obtain the file data in clear form which permits recovery of the data file at the other $Host^k$ system. The protected data file may now be transported by a human being, registered mail or the like or by a teleprocessing means to the $Host^k$ system.

At the receiving $Host^k$ system, when it is desired to recover the data file and decipher the enciphered $Host^j$ data, it is necessary to perform a decipher DCPH function which requires the parameter $E_{KMH\phi k}KF^j$. However, this parameter must be retrieved from the header information in the data file. Accordingly, the data file is read to the Host$^k$ memory and a transformation function is performed by the Host$^k$ system. This is accomplished by using the enciphered key encrypting key $E_{KMH2-kKEK^{jk}}$, accessed in an authorized manner and the enciphered file key $E_{KEK^{jk}}KF^j$ read from the data file, to perform a privileged RTMK transformation operation which reenciphers the file key from encipherment under the key encrypting key to encipherment under the host master key i.e. from $E_{KEK^{jk}}KF^j$ to $E_{KMH\phi k}KF^j$.

Now, using the parameter $E_{KMH\phi k}KF^j$, the data file can be deciphered by performing a decipher DCPH function DCPH[$E_{KMH\phi k}KF^j, E_{KF_j}$DATA]→DATA. In executing this operation, a decipher key operation DECK[$E_{KMH\phi k}KF^j$]→$KF^j$ is first performed to obtain the file key in clear form as the working key, after which a decipher data operation DEC($E_{KF_j}$DATA)→DATA is performed on the enciphered data read from the data file to obtain Host$^j$ ciphertext in clear form at Host$^k$ system.

Data management is concerned with the control, retrieval and storage of information to be processed by a data processor. It generally includes an access method which is primarily responsible for organizing and moving information between a host memory and secondary storage media. There are numerous state of the art data management techniques in existence for managing the creation and recovery of data file, none of which are considered critical to the cryptographic techniques of the present invention. Therefore, in order to simplify and aid in understanding the cryptographic techniques of the present invention, as applied to various file security applications, the descriptions which follow assume that the host system contains the normal data management facilities for organizing and moving information between the host memory and secondary storage media and, therefore, the descriptions are generally restricted to the cryptographic techniques used to provide file security. Additionally, the descriptions which follow, in connection with FIGS. 18 through 21, are keyed to numbered notations in order to aid in understanding the sequence of operations performed in carrying out the file security application shown in each figure.

FILE SECURITY IN MULTIPLE DOMAIN SYSTEMS USING CROSS-DOMAIN KEYS

Figure 18:
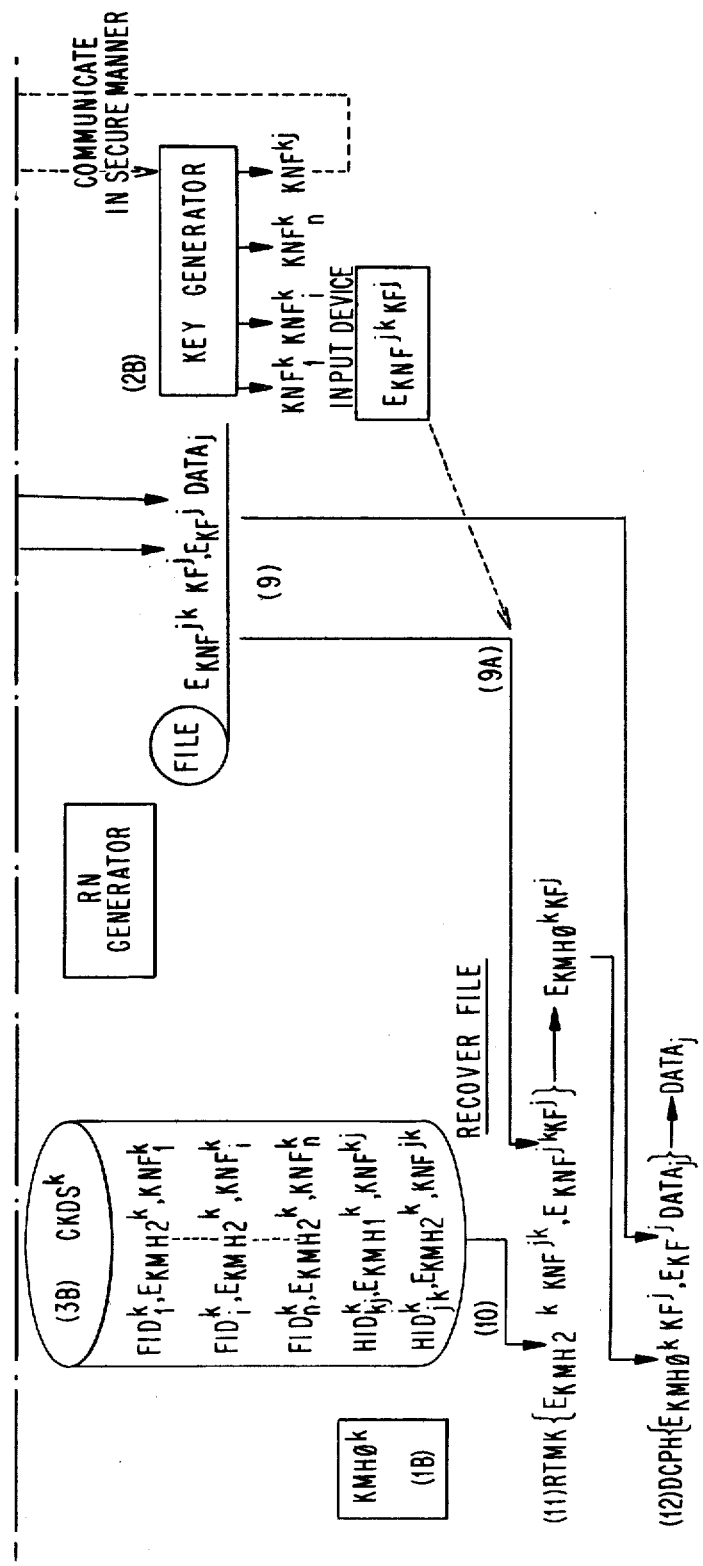
FIGS. 18a and b are a block diagram illustrating details of cryptographic file security in a multiple domain data processing system.

Referring now to FIG. 18, there is shown in block diagram form, a logical view of file security in a multiple domain data processing system using a system generated cross-domain key. At host initialization time of each host system in the different domains, (1) host master keys (KMH$\phi^j$) and (KMH$\phi^k$) are selected and loaded into MK memory of the respective host systems by a manual WMK function or by requesting the execution of a WMK function under host control, (2) each host system then requests a series of GRN functions to be executed to define a series of secondary file keys (KNF$_1$-KNF$_n$) for each of the storage media associated with each host system and a cross-domain key (KNF$^{jk}$) and (KNF$^{kj}$) for each host system, respectively, for cross-domain file communication with the other host system. The cross-domain keys are then distributed to an authorized user in the other domain in a secure manner, as by courier, registered mail, public telephone, etc, for laoding into the host system of the other domain. (3) Each host system next requests a series of EMK2 functions to be performed to encipher each of the generated secondary file keys and the cross-domain key received from the other host system under the second variant of the Host$^j$ master key ($E_{KMH2j}KNF_1{}^j$ - - - $E_{KMH2j}KNF_n{}^j$) and ($E_{KMH2j}KNF^{kj}$) in Host$^j$ and ($E_{KMH2k}KNF_1{}^k$ - - - $E_{KMH2k}KNF_n{}^k$) and ($E_{KMH2k}KNF^{jk}$) in Host$^k$. Each host system then requests an EMK1 function to be performed to encipher the sending cross-domain key under the first variant of the host master key ($E_{KMH1j}KNF^{jk}$) and ($E_{KMH1k}KNF^{kj}$) which are then written to respective cryptographic data sets (CKDS) along with file and host ID's for subsequent retrieval when cryptographic operations are to be performed.

When a data file is to be created at the Host$^j$ system for recovery at the Host$^k$ system, the Host$^j$ creates a file recovery key and arranges for its transfer to a designated storage media. Accordingly, the Host$^j$ system requests a (4) GRN function to be performed to generate a random number which is defined as the primary file key enciphered under the Host$^j$ system master key i.e. RN = $E_{KMH\phi j}KF^j$, in keeping with the objective that no key shall occur in clear form, with the enciphered file key being retained in the Host$^j$ memory for a subsequent crytpographic encipher operation. In order to utilize the file key for creating the file recovery key, the Host$^j$ system next requests a (5) privileged RFMK transformation operation to be performed. This is accomplished by accessing the CKDS, in an authorized manner, for the enciphered cross-domain key $E_{KMH1}KNF^{jk}$ as the key parameter and accessing the host memory for the enciphered file key $E_{KMH\phi j}KF^j$ as the data parameter to perform the privileged RFMK operation, whereby the file key is reenciphered from encipherment under the host master key $E_{KMH\phi j}KF^j$ to encipherment under the cross-domain key $E_{KNF^{jk}}KF^j$ as the file recovery key. Having generated the quantity $E_{KMH\phi j}KF^j$, the Host$^j$ system now requests that an (6) ECPH operation be performed to encipher Host$^j$ data to obtain Host$^j$ ciphertext as the data file using the file key enciphered under the Host$^j$ master key. Following completion of the encipher data operation, the parameter $E_{KMH\phi j}KF^j$ is erased from the Host$^j$ memory in order to prevent unauthorized persons from gaining access to this information and using it to decipher the enciphered data by a decipher DCPH function. (7) The Host$^j$ system now causes the file recovery key $E_{KNF^{jk}}KF^j$, as header information, together with the enciphered Host$^j$ data $E_{KF_j}$DATA$_j$ to be written on the secondary storage media as a data file. Optionally, instead of writing the file recovery key to the storage media, the file recovery key can be written to an output device i.e. a printer, with the output being offloaded and treated as a personal key. Under these circumstances, access to the enciphered data can be controlled or additionally controlled by the means by which the file recovery key is maintained secret e.g. in a physically secure vault, until the data file is to be recovered. (8) The data file may now be transported by a courier, registered mail or the like or be read and transmitted over a communication line using the communication security technique described in the aforementioned co-pending application Ser. No. 857,531, to the Host$^k$ system. (9) When the data file is to be recovered, the file is read to the Host$^k$ system and optionally, if the file recovery key had been offloaded and maintained in secrecy as a personal key, the file recovery key is communicated in a secure manner to an authorized user in the Host$^k$ system and loaded via an input device into the Host$^k$ system. (10) The Host$^k$ system now accesses the CKDS in an authorized manner to obtain the enciphered cross-domain key $E_{KMH2k}KNF^{jk}$ and performs (11) a privileged RTMK transformation operation using the enciphered cross-domain key and the file recovery key $E_{KNFjk}KF^j$ read from the data file or loaded via the input device to reencipher the file key from encipherment under the cross-domain key to encipherment under the Host$^k$ master key i.e. from $E_{KNFjk}KF^j$ to $E_{KMH\phi k}KF^j$. (12) The Host$^k$ system, using the parameter $E_{KMH\phi k}KF^j$ can now decipher the data file by performing a DCPH operation to obtain the Host$^j$ data in clear from at the Host$^k$ system.

While the above example of file security for a data file created by Host$^j$ system for recovery by Host$^k$ system utilized a system generated cross-domain key $KNF^{jk}$, it will be apparent that, if desired, the user at the Host$^j$ system may pre-define a private cross-domain key $KNFP^{jk}$ and communicate same in a secure manner to an authorized user in the Host$^k$ system. Once having defined the private key so that it is mutually available at both host systems, the balance of the operation for creating a data file at one host system for recovery at another host system using the private key is identical to that described above when using a system generated cross-domain key.

FILE RECOVERY FROM SINGLE DOMAIN TO MULTIPLE DOMAIN SYSTEMS

Referring now to FIG. 19, there is shown in block diagram form, a logical view of file security for a data file originally created for recovery at a first host system and subsequently transporting the data file for recovery at a second host system. There are many situations in a multiple domain data processing system where a secure data file is created and recovered at a first host system for repetitive processing and then maintained for an extended period of time after which it is determined that the data file must be transported for recovery at a second host system. In such situations the file recovery key which is associated with the secure data file and which permits recovery at the first host system must be recovered and replaced with a file recovery key which permits recovery at the second host system. The technique by which a secure data file is created and recovered by a single host system is fully described in the aforementioned co-pending application Ser. No. 857,534.

At host initialization time of each host system in the different domains, (1) host master keys (KMH$\phi^j$) and (KMH$\phi^k$) are selected and loaded into MK memory of the respective host systems by a manual WMK function or by requesting the execution of a WMK function under host control, (2) each host system then requests a series of GRN functions to be executed to define a series of secondary file keys ($KNF_1$-$KNF_n$) for each of the storage media associated with each host system and a cross-domain key ($KNF^{jk}$) and ($KNF^{kj}$) for each host system, respectively. The cross-domain keys are then distributed to an authorized user in the other domain in a secure manner, as by courier, registered mail, public telephone, etc., for loading into the host system of the other domain. (3) Each host system next requests a series of EMK2 functions to be performed to encipher each of the generated secondary file keys and the cross-domain key received from the other host system under the second variant of the host master key ($E_{KMH2j}KNF_1^j$ - - - $E_{KMH2j}KNF_n^j$) and ($E_{KMH2j}KNF^{kj}$) in Host$^j$ and ($E_{KMH2k}KNF_1^k$ - - - $E_{KMH2k}KNF_n^k$) and ($E_{KMH2k}KNF^{jk}$) in Host$^k$. Each host system then requests an EMK1 function to be performed to encipher the sending cross-domain key under the first variant of the host master key ($E_{KMH1j}KNF^{jk}$) and ($E_{KMH1k}KNF^{kj}$) which are then written to respective cryptographic data sets (CKDS) along with the file and host ID's for subsequent retrieval when cryptographic operations are to be performed.

When a data file is to be created and recovered at the Host$^j$ system, the Host$^j$ system provides a file recovery key and arranges for its transfer to a designated storage media. Accordingly, the Host$^j$ system requests a (4) GRN operation to be performed to generate a random number which is defined as being the primary file key enciphered under the secondary file key i.e. RN = $E_{KNFij}KF^j$, of the designated storage media, in keeping with the objective that no key shall occur in clear form, with the enciphered file key being retained in the Host$^j$ memory as the file recovery key. In order to utilize the primary file key for enciphering data, the Host$^j$ system next requests a (5) privileged RTMK transformation operation to be performed. This is accomplished by accessing the CKDS, in an authorized manner, for the enciphered secondary file key $E_{KMH2j}KNF^j$ of the designated storage media as the key parameter and accessing the Host$^j$ memory for the recovery file key $E_{KNFij}KF^j$ as the data parameter to perform the privileged RTMK operation, whereby the file key is reenciphered from encipherment under the secondary file key to encipherment under the Host$^j$ master key $E_{KMH\phi j}KF^j$. Having derived the quantity $E_{KMH\phi j}KF^j$, the Host$^j$ system now requests that an (6) ECPH operation be performed to encipher Host$^j$ data to be stored on the designated storage media using the file key now enciphered under the Host$^j$ master key. Following completion of the encipher data operation, the parameter $E_{KMH\phi j}KF^j$ is erased from the host memory in order to prevent unauthorized persons from gaining access to this information and using it to decipher the enciphered data by a decipher DCPH function. (7) The Host$^j$ system now causes the file recovery key $E_{KNFij}KF^j$, as header information, together with the enciphered Host$^j$ data $E_{KFj}DATA_j$ to be written on the secondary storage media as a data file. With this form of security, the secure data file may be recovered and further processed at the Host$^j$ system. However, when it is determined that the data file is to be transported for recovery at the Host$^k$ system, the header information containing the file recovery key must be recovered and replaced with a file recovery key which permits recovery of the data file at the Host$^k$ system. Accordingly, (8) the header information containing the single domain file recovery key is read to the Host$^j$ system. (9) The Host$^j$ system now accesses the CKDS in an authorized manner to obtain the enciphered file key $E_{KMH2j}KNF^j$ and performs (10) a privileged RTMK transformation operation using the enciphered secondary file key $E_{KMH2j}KNF^j$ and the file recovery key $E_{KNFij}KF^j$ read from the data file to reencipher the file key from encipherment under the secondary file key to encipherment under the Host$^j$ master key i.e. from $E_{KNFij}KF^j$ to $E_{KMH\phi j}KF^j$.

In order to create the file recovery key for recovery of the data file at the Host$^k$ system, the Host$^j$ system next requests a (11) privileged RFMK transformation operation to be performed. This is accomplished by accessing the CKDS, in an authorized manner, for the enciphered cross-domain key $E_{KMH1j}KNF^{jk}$ as the key parameter and accessing the Host$^j$ memory for the enciphered file key $E_{KMH\phi j}KF^j$ as the data parameter to perform the privileged RFMK operation, whereby the file key is reenciphered from encipherment under the Host$^j$ master key $E_{KMH\phi j}KF^j$ to encipherment under the cross-domain key $E_{KNFjk}KF^j$ as the new file recovery key. (12) The new file recovery key $E_{KNFjk}KF^j$ may now be written as the new header information for the data file to permit recovery at the Host$^k$ system. Optionally, instead of writing the new file recovery key to the storage media, the file recovery key can be written to an output device i.e. a printer, with the output being offloaded and treated as a personal key. Under these circumstances, access to the enciphered data can be controlled or additionally controlled by the means by which the file recovery key is maintained secret e.g. in a physically secure vault, until the data file is to be recovered. (13) The secure data file may now be transported by courier, registered mail or the like or be read and transmitted over a communication line using the communication security described in the aforementioned co-pending application Ser. No. 857,531, to the Host$^k$ system. (14) When the data file is to be recovered, the file is read to the Host$^k$ system and optionally, if the file recovery key had been offloaded and maintained in secrecy as a personal key, the file recovery key is communicated in a secure manner to an authorized user in the Host$^k$ system and loaded via an input device into the Host$^k$ system. (15) The Host$^k$ system now accesses the CKDS in an authorized manner to obtain the enciphered cross-domain key $E_{KMH2k}KNF^{jk}$ and performs (16) a privileged RTMK transformation operation using the enciphered cross-domain key and the recovery file key $E_{KNFjk}KF^j$ read from the data file or loaded via the input device to reencipher the file key from encipherment under the cross-domain key to encipherment under the Host$^k$ master key i.e. from $E_{KNFjk}KF^j$ to $E_{KMH\phi k}KF^j$. (17) The Host$^k$ system, now using the parameter $E_{KMH\phi k}KF^j$ can decipher the data file by performing a decipher DCPH operation to obtain the Host$^j$ data in clear form at the Host$^k$ system.

FILE SECURITY IN MULTIPLE DOMAIN SYSTEMS USING A PRIVATE KEY

Figure 20:
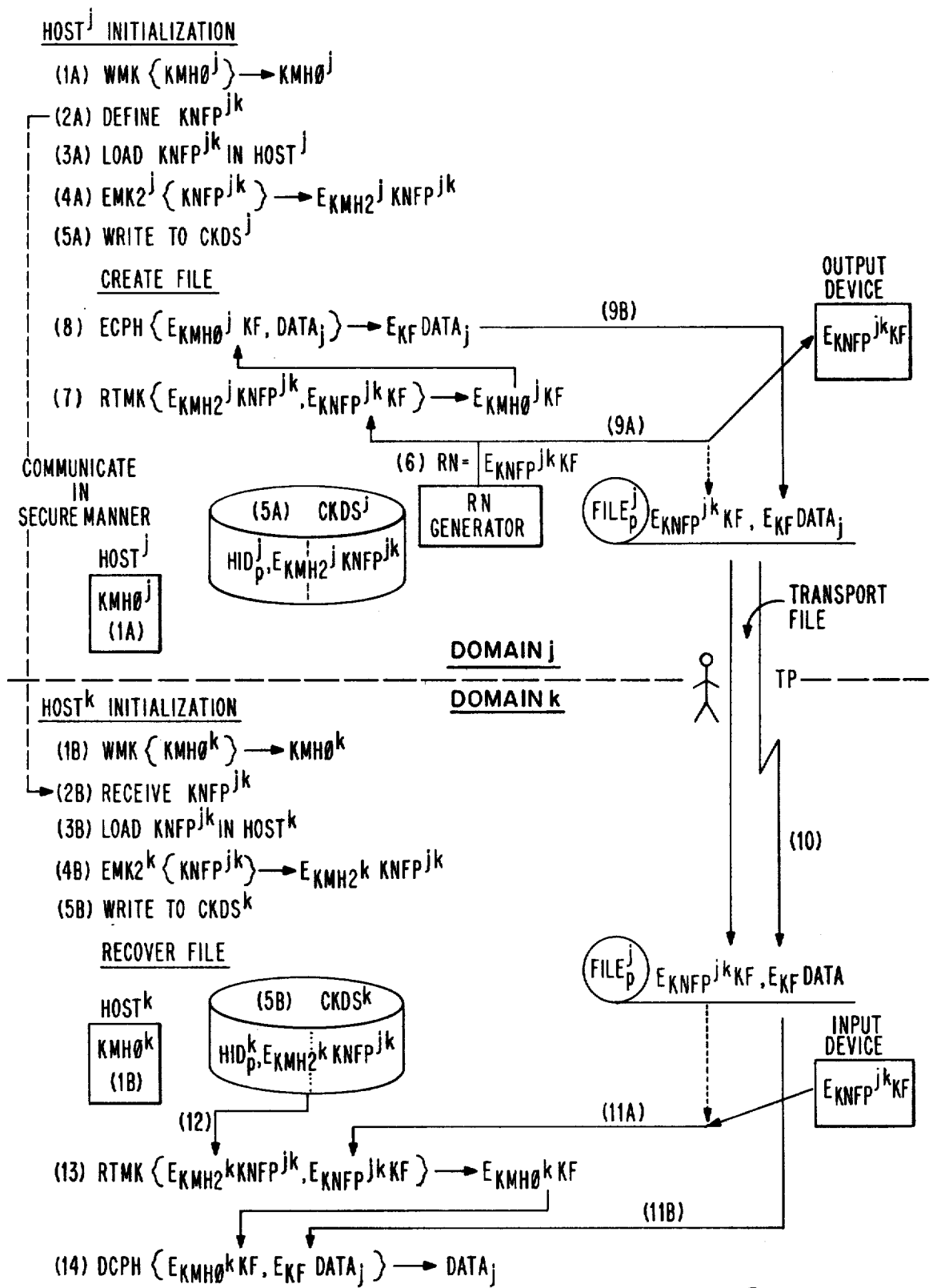
FIG. 20 is a block diagram illustrating details of cryptographic file security in a multiple domain data processing system using a private cross-domain key.

Referring now to FIG. 20, there is shown in block diagram form, a logical view of file security for a data file created at a host system in one domain for recovery at a host system in another domain of a multiple domain data processing system using a private key. In some situations, a private level of file security can be established using a private end user protocol. Therefore, in such situations, file security may be obtained by using a private cross-domain key i.e. $KNFP^{jk}$, which is not system generated but is pre-defined by an end user. Accordingly, at host initialization time of each host system in the different domains, (1) host master keys ($KMH\phi^j$) and ($KMH\phi^k$) are selected and loaded into MK memory of the respective host systems by a manual WMK function or by requesting the execurtion of a WMK function under host control. (2) The end user at the Host$^j$ system then defines a private cross-domain key $KNFP^{jk}$ to be used in creating a file recovery key which permits recovery at the Host$^k$ system. The private key is communicated to an authorized user at the Host$^k$ system in a secure manner, as by courier, registered mail, public telephone, etc., and the key is (3) loaded into the respective host systems. (4) Each host system next requests an EMK2 operation to be performed to encipher the private cross-domain key under the second variant of the respective host master keys ($E_{KMH2j}KNFP^{jk}$) in Host$^j$ and ($E_{KMH2k}KNFP^{jk}$) in Host$^k$ which are then (5) written to respective cryptographic data sets (CKDS) along with the host ID's for subsequent retrieval when cryptographic operations are to be performed.

When a data file is to be created, at the Host$^j$ system, the Host$^j$ system provides a file recovery key and arranges for its transfer to a designated storage media. Accordingly, Host$^j$ system requests a (6) GRN operation to be performed to generate a random number which is defined as being the primary file key enciphered under the private cross-domain key i.e. $RN = E_{KNFPjk}KF$, in keeping with the objective that no key shall occur in clear form, with the enciphered file key being retained in the Host$^j$ memory as the file recovery key. In order to utilize the primary file key for enciphering data, the Host$^j$ system next requests a (7) privileged RTMK transformation operation to be performed. This is accomplished by accessing the CKDS, in an authorized manner, for the enciphered private cross-domain key $E_{KMH2j}KNFP^{jk}$ as the key parameter and accessing the host memory for the file recovery key $E_{KNFPjk}KF$ as the data parameter to perform the privileged RTMK operation, whereby the primary file key is reenciphered from encipherment under the private cross-domain key to encipherment under the Host$^j$ master key $E_{KMH\phi j}KF$. Having derived the quantity $E_{KMH\phi j}KF$, the Host$^j$ system now requests that an (8) ECPH operation be performed to encipher Host$^j$ data to be stored on the designated storage media using the primary file key now enciphered under the Host$^j$ master key. Following completion of the encipher data operation, the parameter $E_{KMH\phi j}KF$ is erased from the Host$^j$ memory in order to prevent unauthorized persons from gaining access to this information and using it to decipher the enciphered data by a decipher DCPH function. (9) The Host$^j$ system now causes the enciphered Host$^j$ data $E_{KF}$DATA; to be written on the secondary storage media as the data file. The file recovery key may be written as header information for the data file but this permits an unauthorized person who obtains a copy of the data file and who has access to the Host$^j$ system to perform the privileged RTMK transformation function to obtain the primary file key to a form i.e. $KMH\phi^j KF$ usable in the non-privileged DCPH function to obtain the Host$^j$ data file in clear form. Therefore, instead of writing the file recovery key to the storage media, a more secure method would be to have the file recovery key written to an output device i.e. a printer, with the output being offloaded and treated as a personal key. Under these circumstances, access to the enciphered data can be controlled or additionally controlled by the means by which the enciphered file key is maintained secret e.g. in a physically secure vault, until the data file is to be recovered. (10) The secure data file may now be transported by courier, registered mail or the like or be read and transmitted over a communication line using the communication security described in the aforementioned co-pending application Ser. No. 857,531, to the Host$^k$ system. (11) When the data file is to be recovered at Host$^k$ system, the file is read to the Host$^k$ system and the file recovery key previously offloaded and maintained in secrecy as a personal key is communicated in a secure manner to an authorized user at the Host$^k$ system and loaded via an input device into the Host$^k$ system or optionally read as header information along with the data file. (12) The Host$^k$ system now accesses the CKDS in an authorized manner to obtain the enciphered cross-domain key $E_{KMH2k}KNFP^{jk}$ and performs (13) a privileged RTMK transformation operation using the enciphered cross-domain key and the file recovery key $E_{KNFPjk}KF$ loaded via the input device or read from the data file to reencipher the primary file key from encipherment under the private cross-domain key to encipherment under the Host$^k$ master key i.e. from $E_{KNFPjk}KF$ to $E_{KMH\phi k}KF$. (14) The Host$^k$ sytem, now using the parameter $E_{KMH\phi k}KF$ can decipher the data file by performing a decipher DCPH operation to obtain the Host$^j$ data in clear form at the Host$^k$ system.

In some situations involving a private key, a private level of file security can be established using a protocol whereby key selection and management are the user's responsibility and requests for cryptographic service are explicitly expressed by the end user. Therefore, in such a situation, using a private cross-domain key, as in the previous example, the end user defines the private cross-domain key as before, communicates it to the other end user in a secure manner, both load it into their respective host memory and requests are made to perform an EMK2 operation to obtain the protected private cross-domain key $E_{KMH2}KNFP^{jk}$ at both Host systems. However, in this instance, since cryptographic services are explicitly expressed by the end users rather than the system, the protected cross-domain keys are not written out to CKDS's but rather to an output device e.g. a printer, and the output copy stored in a secure manner e.g. a vault, until such time as a data file is to be created at one host system. At either of those times, the output copy is taken out of whatever secure area it was stored in and the protected cross-domain key is loaded into the host memory for subsequent use when cryptographic services are requested in creating a data file or recovering a data file. The balance of the operation for creating a data file at one host system or recovering the data file at another host system is identical to that described above in connection with the arrangement shown in FIG. 20.

FILE SECURITY IN MULTIPLE DOMAIN SYSTEMS USING A PRIVATE KEY AND TOTALLY PRIVATE PROTOCOL

Referring now to FIG. 21, there is shown in block diagram form, a logical view of file security for a data file created at a host system in one domain for recovery at a host system in another domain of a multiple domain data processing system using a private key and a private protocol which is totally private and therefore unknown to the processing system. In totally private systems, key selection, key management and data transfer is accomplished without system knowledge that cryptography is being performed. Whatever cryptography is performed is known only to the end users. Therefore, in this case, at host initialization time of each host system in the different domains, (1) host master keys (KMH$\phi^j$) and (KMH$\phi^k$) are selected and loaded into MK memory of the respective host systems by a manual WMK function or by requesting the execution of a WMK function under host control. (2) The end user at the Host$^j$ system then defines a private cross-domain file key to be used in creating the data file for recovery at the Host$^k$ system. The private file key is communicated to an authorized user at the Host$^k$ system in a secure manner, as by courier, registered mail, public telephone, etc., and the key is (3) loaded into the respective host systems. (4) Each host system next requests an EMK$\phi$ operation to be performed to encipher the private cross-domain file key under the respective host master key ($E_{KMH\phi j}KFP^{jk}$) in Host$^j$ and ($E_{KMH\phi k}KFP^{jk}$) in Host$^k$. (5) The resulting enciphered values are not written out to a CKDS but rather to an output device i.e. a printer device, and (6) the respective copy of the enciphered file key is stored in a secure manner e.g. a vault, at each host system until such time as a data file is to be created or recovered. At the time the data file is to be created at the Host$^j$ system, the copy is taken out of whatever secure area it was stored in and (7) the enciphered private file key is loaded into the Host$^j$ memory for subsequent cryptographic service. A request is next made for an (8) ECPH operation to be performed to encipher Host$^j$ data using the enciphered private file key KFP$^{jk}$ as the operational key to obtain enciphered data $E_{KFPjk}$-DATA; for transfer to the storage media as the data file. (9) The secure data file may now be transported by courier, registered mail or the like or be read and transmitted over a communication line to the Host$^k$ system. (10) When the data file is to be subsequently recovered at the Host$^k$ system, the enciphered private file key is taken out of its securely stored area at the Host$^k$ system and loaded into the Host$^k$ memory for subsequent use when cryptographic service is requested. (11) The data file is now read to the Host$^k$ system and a request is made for (12) a decipher DCPH operation to be performed to decipher the data file to obtain Host$^j$ data in clear form at the Host$^k$ system.

While the invention has been particularly shown and described with reference to the preferred embodiment thereof, it will be understood by those skilled in the art that several changes in form and detail may be made without departing from the spirit and scope of the invention.

What is claimed is:

1. In a multiple domain data processing system providing file security for a data file created by a first host system in one domain and recovered by a second host system in another domain, a first host system arrangement for creating said data file comprising:

means providing a file recovery key for said data file for subsequent recovery at said second host system representing a primary file key enciphered under a file cross domain key for cross domain file communication between said first and second host systems, means providing first host system plaintext, and means performing a cryptographic operation to encipher said first host system plaintext under said primary file key to obtain first host system ciphertext for said data file.

2. In a multiple domain data processing system as defined in claim 1 wherein said file recovery key is provided as header information for said data file.

3. In a multiple domain data processing system as defined in claim 1 wherein said file recovery key is maintained as a private file recovery key.

4. In a multiple domain data processing system as defined in claim 1 wherein said system further includes a second host system arrangement for recovery of said data file comprising:

means providing said file recovery key at said second host system, means operably responsive to said file recovery key to perform a cryptographic operation for reenciphering said primary file key from encipherment under said cross domain file key to encipherment under a first key encrypting key of said second host system, means providing said data file of first host system ciphertext at said second host system, and means operably responsive to said primary file key enciphered under said first key encrypting key of said second host system and said data file of first host system ciphertext to perform a cryptographic operation providing said first host system ciphertext in clear form at said second host system.

5. In a multiple domain data processing system providing file security for a data file created by a first host system in one domain and recovered by a second host system in another domain, a first host system arrangement for creating said data file comprising:

means providing a primary file key enciphered under a first key encrypting key of said first host system, means providing a file cross domain key for cross domain file communication between said first and second host systems enciphered under a second key encrypting key of said first host system, means operably responsive to said enciphered cross domain key and said enciphered primary file key to perform a cryptographic operation providing a file recovery key for subsequent recovery of said data file at said second host system, means providing first host system plaintext, and means operably responsive to said primary file key enciphered under said first key encrypting key and said first host system plaintext to perform a cryptographic operation providing first host system ciphertext for said data file.

6. In a multiple domain processing system as defined in claim 5 wherein said file recovery key is said primary file key enciphered under said cross domain key.

7. In a multiple domain processing system as defined in claim 6 wherein said first host system ciphertext is said first host system plaintext enciphered under said primary file key.

8. In a multiple domain data processing system providing file security for a data file created by a first host system in one domain and recovered by a second host system in another domain, a first host system arrangement for creating said data file comprising:

means providing a primary file key enciphered under a first key encrypting key of said first host system, means providing a file cross domain key for cross domain file communication between said first and second host systems enciphered under a second key encrypting key of said first host system, means operably responsive to said enciphered cross domain key and said enciphered primary file key to perform a cryptographic operation providing said primary file key enciphered under said cross domain key as a file recovery key for subsequent recovery of said data file at said second host system, means providing first host system plaintext, and means operably responsive to said primary file key enciphered under said first key encrypting key and said first host system plaintext to perform a cryptographic operation providing said first host system plaintext enciphered under said primary file key as first host system ciphertext for said data file.

9. In a multiple domain data processing system as defined in claim 8 wherein said first key encrypting key is a first master key and said second key encrypting key is a second master key.

10. In a multiple domain data processing system as defined in claim 9 wherein said second master key is a variant of said first master key.

11. In a multiple domain data processing system as defined in claim 8 wherein said file recovery key is provided as header information for said data file.

12. In a multiple domain data processing system as defined in claim 8 wherein said file recovery key is maintained as a private file recovery key.

13. In a multiple domain data processing system providing file security for a data file created by a first host system in one domain and recovered by a second host system in another domain, a first host system arrangement for creating said data file comprising:

means providing a primary file key enciphered under a first host system master key, means providing a file cross domain key for cross domain file communication between said first and second host systems enciphered under a variant of said first host system master key, means operably responsive to said enciphered cross domain key and said enciphered primary file key to perform a cryptographic operation providing said primary file key enciphered under said cross domain key as a file recovery key for subsequent recovery of said data file at said second host system, means providing first host system plaintext, and means operably responsive to said primary file key enciphered under said first host system master key and said first host system plaintext to perform a cryptographic operation providing said first host system plaintext enciphered under said primary file key as first host system ciphertext for said data file.

14. In a multiple domain data processing system as defined in claim 5 wherein said system further includes a second host system arrangement for recovery of said data file comprising:

means providing said cross domain key enciphered under a first key encrypting key of said second host system, means providing said file recovery key at said second host system, means operably responsive to said cross domain key enciphered under said first key encrypting key of said second host system and said file recovery key to perform a cryptographic operation providing said primary file key enciphered under a second key encrypting key of said second host system, means providing said data file of first host system ciphertext at said second host system, and means operably responsive to said primary file key enciphered under said second key encrypting key of said second host system and said data file of first host system ciphertext to perform a cryptographic operation providing said first host system ciphertext in clear form at said second host system.

15. In a multiple domain data processing system as defined in claim 14 wherein said key encrypting keys of said second host system as master keys which are different from each other.

16. In a multiple domain data processing system as defined in claim 14 wherein said first key encrypting key of said second host system is a variant of said second key encrypting key of said second host system.

17. In a multiple domain data processing system as defined in claim 14 wherein said file recovery key is provided as header information of said data file.

18. In a multiple domain data processing system as defined in claim 14 wherein said file recovery key is provided as a private key.

19. In a multiple domain data processing system providing file security for a data file created by a first host system in one domain and recovered by a second host system in another domain wherein said data file consists of header information comprising a primary file key enciphered under a cross domain key provided by said first host system and first host system plaintext enciphered under said primary file key, a second host system arrangement for recovery of said data file comprising:

- means providing said cross domain key enciphered under a first key encrypting key of said second host system,
- means providing said primary file key enciphered under said cross domain key at said second host system,
- means operably responsive to said cross domain key enciphered under said first key encrypting key of said second host system and said primary file key enciphered under said cross domain key to perform a cryptographic operation providing said primary file key enciphered under a second key encrypting key of said second host system,
- means providing said data file of first host system plaintext enciphered under said primary file key at said second host system, and
- means operably responsive to said primary file key enciphered under said second key encrypting key of said second host system and said data file of first host system plaintext enciphered under said primary file key to perform a cryptographic operation providing said first host system plaintext at said second host system.

20. In a data processing system providing file security for a data file created by a first host system in one domain for recovery at said first system wherein said data file consists of header information comprising a primary file key enciphered under a secondary file key and first host system plaintext enciphered under said primary file key, a first host system arrangement for replacing said header information with a file recovery key for recovery of said data file at a second host system in another domain comprising:

- means providing said secondary file enciphered under a first key encrypting key of said first host system,
- means providing said header information at said first host system,
- means operably responsive to said enciphered secondary file key and said header information to perform a cryptographic operation providing said primary file key enciphered under a second key encrypting key of said second host system,
- means providing a cross domain key for cross domain communication between said first and second host systems enciphered under a third key encrypting key of said first host system, and
- means operably responsive to said enciphered cross domain key and said primary file key enciphered under said second key encrypting key of said first host system to perform a cryptographic operation providing said primary file key enciphered under said cross domain key as said file recovery key.

21. In a data processing system as defined in claim 20 wherein said file recovery key is maintained as a private key for use at said second host system.

22. In a multiple domain data processing system providing file security for a private data file created by a first host system in one domain and recovered by a second host system in another domain, a first host system arrangement for creating said data file comprising:

- means providing a primary file key enciphered under a private cross domain key as a private file recovery key,
- means providing said private cross domain key enciphered under a first key encrypting key of said first host system,
- means operably responsive to said enciphered private cross domain key and said private recovery key to perform a cryptographic operation providing said primary file key enciphered under a second key encrypting key of said first host system,
- means providing first host system plaintext, and
- means operably responsive to said primary file key enciphered under said second key encrypting key of said first host system and said first host system plaintext to perform a cryptographic operation providing first host system ciphertext for said data file.

23. In a multiple domain data processing system as defined in claim 22 wherein said system further includes a second host system arrangement for recovery of said private data file comprising:

- means providing said private cross domain key enciphered under a first key encrypting key of said second host system,
- means providing said private file recovery key at said second host system,
- means operably responsive to said private cross domain key enciphered under said first key encrypting key of said second host system and said private file recovery key to perform a cryptographic operation providing said primary file key enciphered under a second key encrypting key of said second host system,
- means providing said private data file of first host system ciphertext at said second host system, and
- means operably responsive to said primary file key enciphered under said second key encrypting key of said second host system and said private data file of first host system ciphertext to perform a cryptographic operation providing said first host system ciphertext in clear form at said second host system.

24. In a multiple domain data processing system providing file security for a data file created by a first host system in one domain and recovered by a second host system in another domain, the method of creating said data file at said first host system comprising the steps of:

- providing a file recovery key for said data file for subsequent recovery at said second host system representing a primary file key enciphered under a file cross domain key for cross domain file communication between said first and second host systems,
- providing first host systems plaintext, and
- carrying out a cryptographic operation to encipher said first host system plaintext under said primary file key to obtain first host system ciphertext for said data file.

25. In the method as defined in claim 24 wherein said file recovery key is provided as header information for said data file.

26. In the method as defined in claim 24 wherein said file recovery key is maintained as a private file recovery key.

27. In the method as defined in claim 24 which further includes the method of recovery of said data file at said second host system comprising the steps of:
providing said file recovery key at said second host system,
carrying out a cryptographic operation in accordance with said file recovery key for reenciphering said primary file key from encipherment under said cross domain file key to encipherment under a first key encrypting key of said second host system,
providing said data file of first host system ciphertext at said second host system, and
carrying out a cryptographic operation in accordance with said primary file key enciphered under said first key encrypting key of said second host system and said data file of first host system ciphertext to provide said first host system ciphertext in clear form at said second host system.

28. In a multiple domain data processing system providing file security for a data file created by a first host system in one domain and recovered by a second host system in another domain, the method of creating said data file at said first host system comprising the steps of:
providing a primary file key enciphered under a first key encrypting key of said first host system,
providing a file cross domain key for cross domain file communication between said first and second host systems enciphered under a second key encrypting key of said first host system,
carrying out a cryptographic operation in accordance with said enciphered cross domain key and said enciphered primary file key to provide a file recovery key for subsequent recovery of said data file at said second host system,
providing first host system plaintext and,
carrying out a cryptographic operation in accordance with said primary file key enciphered under said first key encrypting key and said first host system plaintext to provide first host system ciphertext for said data file.

29. In the method as defined in claim 28 wherein said file recovery key is said primary file key enciphered under said cross domain key.

30. In the method as defined in claim 29 wherein said first host system ciphertext is said first host system plaintext enciphered under said primary file key.

31. In a multiple domain data processing system providing file security for a data file created by a first host system in one domain and recovered by a second host system in another domain, the method of creating said data file at said first host system comprising the steps of:
providing a primary file key enciphered under a first key encrypting key of said first host system,
providing a file cross domain key for cross domain file communication between said first and second host systems enciphered under a second key encrypting key of said first host system,
carrying out a cryptographic operation in accordance with said enciphered cross domain key and said enciphered primary file key to provide said primary file key enciphered under said cross domain key as a file recovery key for subsequent recovey of said data file at said second host system,
providing first host system plaintext, and
carrying out a cryptographic operation in accordance with said primary file key enciphered under said first key encrypting key and said first host system plaintext to provide said first host system plaintext enciphered under said primary file key as first host system ciphertext for said data file.

32. In the method as defined in claim 31 wherein said file recovery key is provided as header information for said data file.

33. In the method as defined in claim 31 wherein said file recovery key is maintained as a private file recovery key.

34. In the method as defined in claim 28 which further includes the method of recovery of said data file at said second host system comprising the steps of:
providing said cross domain key enciphered under a first key encrypting key of said second host system,
providing said file recovery key at said second host system,
carrying out a cryptographic operation in accordance with said cross domain key enciphered under said first key encrypting key of said second host system and said file recovery key to provide said primary file key enciphered under a second key encrypting key of said second host system,
providing said data file of first host system ciphertext at said second host system, and
carrying out a cryptographic operation in accordance with said primary file key enciphered under said second key encrypting key of said second host system and said data file of first host system ciphertext to provide said first host system ciphertext in clear form at said second host system.

35. In a multiple domain data processing system providing file security for a data file created by a first host system in one domain and recovered by a second host system in another domain wherein said data file consists of header information comprising a primary file key enciphered under a cross domain key provided by said first host system and first host system plaintext enciphered under said primary file key, the method of recovery of said data file comprising the steps of:
providing said cross domain key enciphered under a first key encrypting key of said second host system,
providing said primary file key enciphered under said cross domain key at said second host system,
carrying out a cryptographic operation in accordance with said cross domain key enciphered under said first key encrypting key of said second host system and said primary file key enciphered under said cross domain key to provide said primary file key enciphered under a second key encrypting key of said second host system,
providing said data file of first host system plaintext enciphered under said primary file key at said second host system, and
carrying out a cryptographic operation in accordance with said primary file key enciphered under said second key encyrpting key of said second host system and said data file of first host system plaintext enciphered under said primary file key to provide said first host system plaintext at said second host system.

36. In a data processing system providing file security for a data file created by a first host system in one domain for recovery at said first system wherein said data file consists of header information comprising a primary file key enciphered under a secondary file key and first host system plaintext enciphered under said primary file key, the method of replacing said header information with a file recovery key for recovery of said data file at a second host system in another domain comprising the steps of:

provide said secondary file key enciphered under a first key encrypting key of said first host system, providing said header information at said first host system, carrying out a cryptographic operation in accordance with said enciphered secondary file key and said header information to provide said primary file key enciphered under a second key encrypting key of said second host system, providing a cross domain key for cross domain communication between said first and second host systems enciphered under a third key encrypting key of said first host system, and carrying out a cryptographic operation in accordance with enciphered cross domain key and said primary file key enciphered under said second key encrypting key of said first host system to provide said primary file key enciphered under said cross domain key as said file recovery key.

37. In the method as defined in claim 36 wherein said file recovery key is maintained as a private key for use at said second host system.

38. In a multiple domain data processing system providing file security for a private data file created by a first host system in one domain and recovered by a second host system in another domain, the method of creating said data file comprising the steps of:

providing a primary file key enciphered under a private cross domain key as a private file recovery key, providing said private cross domain key enciphered under a first key encrypting key of said first host system, carrying out a cryptographic operation in accordance with said enciphered private cross domain key and said private recovery key to provide said primary file key enciphered under a second key encrypting key of said first host system, providing first host system plaintext, and carrying out a cryptographic operation in accordance with said primary file key enciphered under said second key encrypting key of said first host system and said first host system plaintext to provide first host system ciphertext for said data file.

39. In a multiple domain data processing system as defined in claim 36 which further includes the method of recovery of said private data file comprising the steps of:

providing said private cross domain key enciphered under a first key encrypting key of said second host system, providing said private file recovery key at said second host system, carrying out a cryptographic operation in accordance with said private cross domain key enciphered under said first key encrypting key of said second host system and said private file recovery key to provide said primary file key enciphered under a second key encrypting key of said second host system, providing said private data file of first host system ciphertext at said second host system, and carrying out a cryptographic operation in accordance with said primary file key enciphered under said second key encrypting key of said second host system and said private data file of first host system ciphertext to provide said first host system ciphertext in clear form at said second host system.

40. In a multiple domain data processing system providing file security for a data file created by a first host system in one domain having cryptographic apparatus provided with multiple keys and recovered by a second host system in another domain having crytopgraphic apparatus provided with multiple keys, an arrangement for creating said data file at one of said host systems using a protected file key and recovering said data file at the other of said host systems without revealing the multiple keys of either of said host systems to the other of said host systems comprising:

means providing a file recovery key for said data file at said first host system for subsequent recovery at said second host system representing a file key enciphered under a file cross domain key for cross domain file communication between said first and second host systems, means providing first host system plaintext, means performing a cryptographic operation for enciphering said first host system plaintext under control of said protected file key to obtain first host system ciphertext for said data file, means providing said file recovery key at said second host system, means operably responsive to said file recovery key to perform a cryptographic operation for reenciphering said file key from encipherment under said cross domain file key to encipherment under a first key encrypting key of said second host system, means providing said data file of first host system ciphertext at said second host system, and means operably responsive to said file key enciphered under said first key encrypting key of said second host system and said data file of first host system ciphertext for performing a cryptographic operation to provide said first host system ciphertext in clear form at said second host system.

41. In a multiple domain data processing system providing file security for a data file created by a first host system in one domain having cryptographic apparatus provided with multiple keys and recovered by a second host system in another domain having cryptograhic apparatus provided with multiple keys, an arrangement for creating said data file at one of said host systems using a protected file key and recovering said data file at the other of said host systems without revealing the multiple keys of either of said host systems to the other of said host systems comprising:

means providing a file key enciphered under a first key encrypting key of said first host system, means providing a file cross domain key for cross domain file communication between said first and second host systems enciphered under a second key encrypting key of said first host system, means operably responsive to said enciphered cross domain key and said enciphered file key to perform a cryptographic operation providing a file recovery key for subsequent recovery of said data file at said second host system, means providing first host system plaintext, means operably responsive to said file key enciphered under said first key encrypting key and said first host system plaintext to perform a cryptographic operation providing first host system ciphertext for said data file, means providing said cross domain key enciphered under a first key encrypting key of said second host system, means providing said file recovery key at said second host system, means operably responsive to said cross domain key enciphered under said first key encrypting key of said second host system and said file recovery key to perform a cryptographic operation providing said file key enciphered under a second key encrypting key of said second host system, means providing said data file of first host system ciphertext at said second host system, and means operably responsive to said file key enciphered under said second key encrypting key of said second host system and said data file of first host system ciphertext to perform a cryptographic operation providing said first host system ciphertext in clear form at said second host system.

42. In a multiple domain data processing system providing file security for a data file created by a first host system in one domain having cryptographic apparatus provided with multiple keys and recovered by a second host system in another domain having cryptographic apparatus provided with multiple keys, the method of creating said data file at one of said host systems using a protected file key and recovering said data file at the other of said host systems without revealing the multiple keys of either of said host systems to the other of said host systems comprising the steps of:

providing a file recovery key for said data file at said first host system for subsequent recovery at said second host system representing a file key enciphered under a file cross domain key for cross domain file communication between said first and second host systems, providing first host system plaintext, carrying out a cryptographic operation to encipher said first host system plaintext under control of said protected file key to obtain first host system ciphertext for said data file, providing said file recovery key at said second host system, carrying out a cryptographic operation in accordance with said file recovery key for reenciphering said file key from encipherment under said cross domain file key to encipherment under a first key encrypting key of said second host system, providing said data file of first host system ciphertext at said second host system, and carrying out a crytographic operation in accordance with said file key enciphered under said first key encrypting key of said second host system and said data file of first host system ciphertext to provide said first host system ciphertext in clear form at said second host system.

43. In a multiple domain data processing system providing file security for a data file created by a first host system in one domain having cryptographic apparatus provided with multiple keys and recovered by a second host system in another domain having cryptographic apparatus provided with multiple keys, the method of creating said data file at one of said host systems using a protected file key and recovering said data file at the other of said host systems without revealing the multiple keys of either of said host systems to the other of said host systems comprising:

providing a file key enciphered under a first key encrypting key of said first host system, providing a file cross domain key for cross domain file communication between said first and second host systems enciphered under a second key encrypting key of said first host system, carrying out a cryptographic operation in accordance with said enciphered cross domain key and said enciphered file key to provide a file recovery key for subsequent recovery of said data file at said second host system, providing first host system plaintext, carrying out a cryptographic operation in accordance with said file key enciphered under said first key encrypting key and said first host system plaintext to provide first host system ciphertext for said data file, providing said cross domain key enciphered under a first key encrypting key of said second host system, providing said file recovery key at said second host system, carrying out a cryptographic operation in accordance with said cross domain key enciphered under said first key encrypting key of said second host system and said file recovery key to provide said file key enciphered under a second key encrypting key of said second host system, providing said data file of first host system ciphertext at said second host system, and carrying out a cryptographic operation in accordance with said file key enciphered under said second key encrypting key of said second host system and said data file of first host system ciphertext to provide said first host system ciphertext in clear form at said second host system.

* * * * *